(12) United States Patent
Griffin et al.

(10) Patent No.: US 11,757,648 B2
(45) Date of Patent: Sep. 12, 2023

(54) SYSTEM AND METHOD FOR REMOTE STARTUP MANAGEMENT

(71) Applicant: Dell Products L.P., Round Rock, TX (US)

(72) Inventors: Christopher Channing Griffin, Cedar Park, TX (US); Adolfo Sandor Montero, Pflugerville, TX (US); Chris Edward Pepper, Leander, TX (US); Purushothama Rao Malluru, Round Rock, TX (US); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/667,911

(22) Filed: Feb. 9, 2022

(65) Prior Publication Data
US 2023/0254151 A1 Aug. 10, 2023

(51) Int. Cl.
*H04L 9/32* (2006.01)
*H04L 9/08* (2006.01)
*H04L 67/125* (2022.01)

(52) U.S. Cl.
CPC .......... *H04L 9/3234* (2013.01); *H04L 9/0877* (2013.01); *H04L 67/125* (2013.01)

(58) Field of Classification Search
CPC ... H04L 9/3234; H04L 9/0877; H04L 67/125; H04L 9/32; H04L 9/08
See application file for complete search history.

(56) References Cited

U.S. PATENT DOCUMENTS

| | | | |
|---|---|---|---|
| 8,250,648 B2* | 8/2012 | Kabzinski | G06F 21/126 713/192 |
| 9,448,785 B1* | 9/2016 | Alexeev | G06F 12/1408 |
| 2008/0028053 A1* | 1/2008 | Kelley | H04L 12/12 709/222 |
| 2020/0356704 A1* | 11/2020 | Velusamy | H04W 12/126 |
| 2022/0083394 A1* | 3/2022 | Noverraz | G06F 8/41 |

* cited by examiner

*Primary Examiner* — Quazi Farooqui
(74) *Attorney, Agent, or Firm* — Womble Bond Dickinson (US) LLP

(57) ABSTRACT

Methods and systems for managing the operation of data processing systems are disclosed. A data processing system may include a computing device that may enter various operating states by performing various types of startups. Performance of some startups may be restricted by use of passwords or other security information. The data processing systems may host management controllers that may bypass the restrictions on the startups. Prior to doing so, the management controllers may verify that the requests to perform the startups are from trusted entities, or should be performed for other reasons.

20 Claims, 15 Drawing Sheets

SYSTEM AND METHOD FOR REMOTE STARTUP MANAGEMENT

FIELD OF THE EMBODIMENTS

Embodiments disclosed herein relate generally to device management. More particularly, embodiments disclosed herein relate to systems and methods to manage performance of startup processes.

BACKGROUND

Computing devices may store data and used stored data. For example, computing devices may utilize data when providing computer implemented services. If computing devices are unable to access data, the computing devices may be unable to provide some, or all, of the computer implemented services that they are able to provide with access to data.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1:
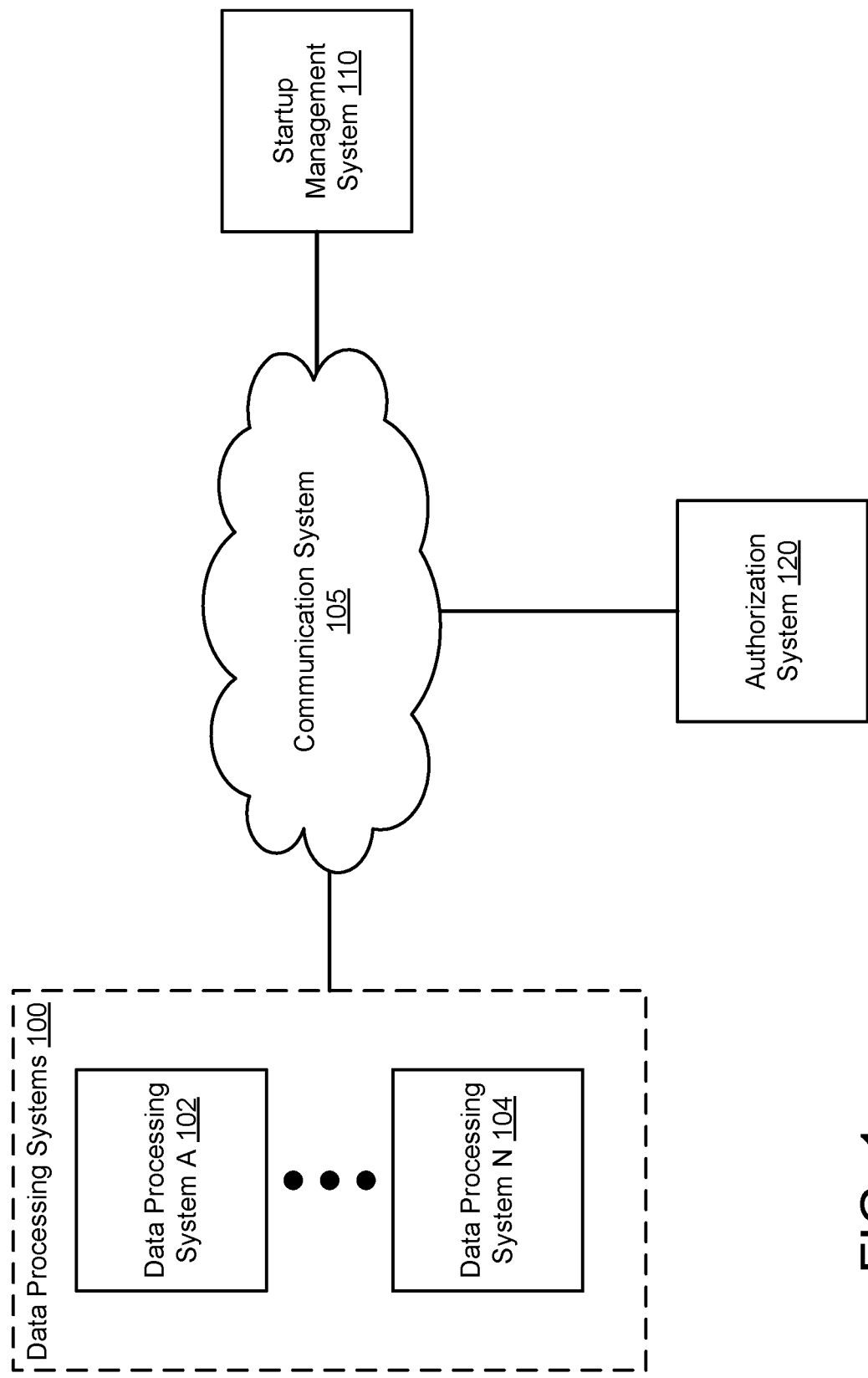
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing the operation of data processing system. A data processing system may include a computing device that may operate in various manner (e.g., operating states). The data processing system may perform different startups (e.g., one or more actions) to enter respective operating states.

Different operating states may be conducive to different functions. For example, some operating state may facilitate provisioning of desired computer implemented services, while other operating states may facilitate management operations such as rescues, modifications in fundamental operation, etc.

To manage which operating state a data processing system enters, a startup management entity (e.g., a startup manager) may place restrictions on which startups may be selectively performed (e.g., in response to commands from a user, another device, etc.). These restrictions may include password (or other credential) protecting various startups. The startup management entity may restrict such startups from being performed unless a password is provided.

To facilitate performance of various startups without use of passwords (or other credentials), a management controller hosted by the data processing system may be treated as a trusted entity. The startup management entity may not restrict the management controller from causing the data processing system from performing startups that are otherwise password (or other credential) protected.

The management controller hosted by a data processing system may receive communications which may indicate various startups are to be performed. However, by virtue of the distributed environments in which data processing systems may reside, the management controller may not act on such communications until the communications (or instructions therein) can be authenticated.

To authenticate the communications, the management controller may utilize an authentication system which the management controller may trust. If a communication is authenticated, then the management controller may take action to cause the data processing system to perform a startup in accordance with the communication. By doing so, data processing systems may be selectively restarted to enter desired operating states without using passwords (or other credentials) that may normally restrict performance of such startups.

By doing so, administrators or other persons tasked with managing data processing system may not need to have access to startup management entity enforced passwords. Consequently, the secrecy of such passwords may be conserved (e.g., by reducing the number of persons that may need to be aware of the passwords) while still allowing persons tasked with managing data processing systems to initiate desired restarts.

In an embodiment, a computer-implemented method for managing operation of a data processing system is provided. The method may include obtaining, by a startup agent of the data processing system, a management communication indicating that the data processing system is to enter a password protected operating state without requiring use of the password to enter the password protected operating state, the startup agent executing while a startup manager of the data processing system that manages startups of the data processing system is not executing, the startups of the data processing system causing the data processing system to enter corresponding operating states; providing, by the startup agent, the management communication to a management controller, the management controller being hosted by the data processing system and operating independently from the data processing system; making a determination, by the management controller, that the management communication is from an entity authorized to modify the startups of the data processing system without use of the password; and based on the determination, modifying, by the management controller, a future startup of the data processing system to enter the password protected operating state without use of the password.

Making the determination may include generating, by the management controller, an unauthenticated operation based on the management communication, the unauthenticated operation comprising a proposed action and authentication data from the entity that initiated the management communication; providing, by the management controller; the unauthenticated operation to an authorization system via a first secure communication; and responsive to the unauthenticated operation, receiving, by the management controller, an authenticated operation from the authorization system via a second secure communication, the authenticated operation indicating that the proposed action should be performed, the proposed action being a startup of the data processing system to the password protected operating state without use of the password.

The first secure communication and second secure communication may be made, at least in part, via the startup agent. For example, the management controller may not have network access independent of the startup agent.

The authenticated operation may include the unauthenticated operation and a signature of the authorization system, the signature being usable by the management controller to verify that the second secure communication is from the authorization system, and the unauthenticated operation of the authenticated operation usable to verify that the authenticated operation is responsive to the first secure communication.

Modifying the future startup of the data processing system to enter the password protected operating state without use of the password may include modifying a startup order that defines an ordering of different type of startups of the data processing system that may be performed by the startup manager, the modified startup order causing the startup manager to perform startup operations to cause the data processing system to enter the password protected operating state. The startup manager may be adapted to allow the management controller to modify the startup order without use of the password and require users of the data processing system to use the password to modify the startup order.

The startup manager may require users of the data processing system to use the password to modify the startup order by requiring that the password be provided by the users prior to being allowed to modify the startup order, and the startup managers allows the management controller to modify the startup order without use of the password by bypassing a requirement for entry of the password for modifying the startup order.

The startup operations may include loading of a serviceability operation manager for the data processing system, the startup agent relying on a general operation manager hosted by the data processing system for its operation, and the serviceability operation manager being adapted to modify the startup agent.

The management communication may be from the entity that is trusted by an authorization system, and the authorization system being trusted by the management controller to identify authorized management communications.

The computer-implemented method may also include obtaining, by the startup agent, a second management communication indicating that the data processing system is to enter the password protected operating state; providing, by the startup agent, the second management communication to the management controller; making a second determination, by the management controller, that the second management communication cannot be verified as being from an entity authorized to modify the startups of the data processing system without use of the password; and based on the second determination, discarding, by the management controller, the second management communication without attempting to implement the second management communication.

Making the second determination may include generating, by the management controller, a second unauthenticated operation based on the second management communication, the second unauthenticated operation comprising a proposed action and second authentication data from the entity that initiated the second management communication; providing, by the management controller; the second unauthenticated operation to an authorization system via a third secure communication; and responsive to the unauthenticated operation, receiving, by the management controller, a response from the authorization system indicating that the second unauthenticated operation cannot be verified.

Making the second determination may include generating, by the management controller, a second unauthenticated operation based on the second management communication, the second unauthenticated operation comprising a proposed action and second authentication data from the entity that initiated the second management communication; providing, by the management controller; the second unauthenticated operation to an authorization system via a third secure communication; and receiving, by the management controller, a second authenticated operation from the authorization system via a fourth secure communication, the second authenticated operation indicating that the proposed action should be performed, the proposed action being the startup of the data processing system to the password protected operating state without use of the password, and the second authenticated operation not being responsive to the second unauthenticated operation. Lack of responsiveness of the second authenticated operation to the second unauthenticated operation may indicate that the second management communication cannot be verified.

When the management communication is received, the data processing system may be in a second operating state that is different from the password protected operating state, the data processing system being adapted to automatically enter the second operating state unless a startup order is modified, and the startup order requiring use of the password for modification.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any quantity and type of computer implemented services. To provide computer implemented services, the system of FIG. 1 may include one or more data processing systems 100 operably connected to a startup management system 110 and/or authorization system 120 via communication system 105. Each of these components is discussed below.

All, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. To provide these services, data processing systems 100 may host applications that provide these (and/or other) computer implemented services. The applications (or other types of executing entities) may presume (and/or may require for proper operation of the applications) that a data processing system hosting the application is operating in a predetermined manner. The predetermined manner of operation may include, for example, executing an operating system, drivers, or other type of management entities that mediate, facilitate, or otherwise operate in a manner which enables the applications to operate (e.g., by providing abstracted access to hardware resources used in the execution of the applications).

To operate in the predetermined manner, data processing systems 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation of the data processing system to an operating system or other type of operational management entity that places data processing systems 100 into the predetermined manner of operation. The operating system may, for example, provide abstracted access to resources (e.g., processing resources provided by processors, memory resource provided by memory modules, storage resources provided by storage devices, etc.) utilized by the applications hosted by the host device.

For example, consider a scenario where a data processing system has been shut off. After the data processing system is turned on, the data processing system may be operating in a startup manner such that the data processing system is not yet able to support execution of an application (e.g., the application may not be able to successfully execute until the data processing system hosts an operating system). To enter the predetermine manner of operation conducive to execution of the application, the data processing system may go through a boot process which may be performed by a type of management entity such as a basic input-output system and/or other startup management entities. The management entity may perform any number of actions (e.g., a "startup process") to prepare the data processing system to begin execution of an operating system or other type of management entity that facilitates execution of applications (and/or operation of certain types of hardware devices such as application specific integrated circuits that may provide certain functions without need for a software layer).

These actions may include, for example, inventorying the hardware components hosted by a host device, loading drivers or other software components, configuring hardware and/or software components, etc. As part of the startup process, the management entity may also load code, configuration settings, and/or other data corresponding to an operating system (and/or other management entity types and/or other types of executing entities) to memory. The data may be stored in persistent storage thereby allowing it to be read into memory.

Once the data is loaded into memory, the data processing system may initiate execution of code (e.g., computer instructions) included in the data in memory to begin operation of the operating system. The executing code may utilize configuration settings and/or other information also included in the data in memory.

Once the data processing system hosts the operating system and/or performs other types of predetermined operations, discussed above, then the applications may begin to provide the computer implemented services. However, the aforementioned process, if not completed in a predetermined manner, may leave the data processing system in a condition where it is unable to provide the computer implemented services, may provide compromised computer implemented services, and/or may otherwise operate in a manner different from expected, desired, etc.

For example, the startup management entity that may be capable of performing multiple types of startup processes that may result in the data processing system being in different operating states. Some of these operating states may be useful for certain purposes such as rescuing a data processing system after it has become damaged, impaired, or otherwise operating in an undesired manner; modifying the startup management entity itself; and/or other types of purposes. However, these other operating states may not be conducive to execution of applications and/or providing computer implemented services desired by users or other devices.

To reduce the likelihood of a data processing system performing a startup that results in an operating state that is not conducive to providing desired computer implemented services, data processing systems 100 may implement one or more mechanisms to restrict or limit the ability of users, other devices, and/or other entities to modify the startup process performed by the respective data processing systems. For example, data processing systems 100 may automatically perform a default startup process that results in transitioning to the predetermined operating state conducive to providing the desired computer implemented services. Further, the ability to change the startup process may require active intervention by a user or other devices, and/or may require credentials, passwords, and/or other types of information to be provided prior to allowing the startup processes to be changed.

While the above process may reduce the likelihood of data processing systems performing startups that result in undesired operating states, it may also present barriers to other users (e.g., administrators, technicians, and/or other parties that may need to place data processing systems 100 into other operating states for various legitimate reasons) performing assigned tasks. For example, if a user may need to perform a recovery that requires transitioning a data processing system to a rescue operating state, the user may need to provide a password. Otherwise, the data processing system may not allow any startup other than the default startup (or may otherwise limit different startups) to be performed.

In general, embodiments disclosed herein relate to systems, devices, and methods for improving the likelihood that data processing systems 100 are able to provide their computer implemented services. To improve the likelihood that data processing systems 100 are able to provide their computer implemented services, data processing systems 100 may be capable of performing various types of startups, as discussed above. These different types of startups may be used over time to repair the data processing systems, modify operation of data processing systems, and/or otherwise perform certain actions that may not be achievable while the data processing systems are operating in a default operating state conducive to providing certain computer implemented services. By performing various types of startups over time, data processing systems 100 may be recovered from errors, upgraded, improved, etc.

Data processing systems 100 may also, as noted above, restrict which types of startups will be performed. To cause data processing systems 100 to perform startup processes other than a default startup process (or restrict access to only certain startup processes while allowing selection of other startup processes), data processing systems 100 may provide two different mechanisms for changing the startup processes performed. The first mechanism may be, as discussed above, through restricting access to the ability to change the startup process using password (or other type of credential) protection. For example, a user (or other device) may be required to input (or otherwise provide) a password to cause the data processing system to perform a different type of startup (e.g., other than the default startup process). Until the password is provided, the data processing system may only allow the default startup process (or a particular selection of startup processes) to be performed.

The second mechanism may facilitate bypassing of the password restriction against changing the startup process without needing to provide the password. The second mechanism may utilize an envelope of trusted devices to proactively change the next startup that will be performed. For example, prior to performing a restart or other startup procedure (e.g., while operating in the predetermined state conducive to providing desired computer implemented services), the data processing system may receive a communication (e.g., from startup management system 110 via communication system 105) indicating that a different type of startup (e.g., one that normally requires input, use of a password other credential, etc.) is to be performed. The communication may be received by an application hosted by the data processing system. After receipt, the application may provide the communication to a management controller hosted by the data processing system. The management control may determine whether the different type of startup should be performed.

If the management controller determines that the different type of startup should be performed, then the management controller may message a startup management entity that the different type of startup should be performed. The management controller may store a copy of the password thereby allowing it to provide it to automatically bypass the password restriction, or may be intrinsically trusted by the startup management entity and therefore not be required to provide the password to cause the startup management entity to perform the different type of startup. Consequently, by causing startup management system 110 to send the communication, an administrator, person, device, etc. may cause data processing systems 100 to perform different password restricted startup processes without accessing, knowing, or otherwise using corresponding passwords. In this manner, an administrator may cause any type of startup process to be performed without requiring the corresponding passwords.

To determine whether the different type of startup should be performed, the management controller may utilize authorization system 120. Authorization system 120 may serve as a source of authentication, verification, validation, etc. for the management controller. The management controller may securely communicate with authorization system 120 to ascertain whether, for example, the communication indicating that the different startup should be performed is from a trusted entity.

For example, the management controller may package the communication and send it to authorization system 120. The package may include security information to prevent replay and/or other types of attacks. Authorization system 120 may review authentication data in the package to ascertain whether the communication is from a trusted entity (and/or whether the instructions in the communication should be implemented for other reasons). If authorization system 120 determines that the instructions in the communication should be implemented and/or the communication is from a trusted entity, then authorization system 120 may append attestation data to the package and return it to the management controller. The management controller may then verify the authenticity of the returned package (e.g., via a previously performed public-private key exchange or other security function) and, presuming that the returned package is authentic, implement the instructions if the attestation indicates that the instructions should be performed.

Startup management system 110 may facilitate remote management of startups of data processing systems 100, as discussed above. To do so, startup management system 110 may register with authorization system 120. Once registered, startup management system 110 may send out communications, as discussed above, to data processing systems 100 to facilitate performance of various types of startups. When sending out communications, startup management system 110 may add authentication data that allows other entities such as authorization system 120 to determine whether the communications are from startup management system 110 or are not authentic (e.g., from another entity masquerading as startup management system 110).

Authorization system 120 may facilitate authentication of communications and/or instructions therein received by data processing systems. Entities may register with authorization system 120. Once registered, authorization system 120 may determine whether the communications and/or instructions therein are from trusted entities (e.g., registered entities). For example, communications sent by trusted entities such as startup management system 110 may include authentication data that allows authorization system 120 to determine whether the communications are actually from the entities that are alleged to have sent the communications.

Any of data processing systems 100, startup management system 110, and authorization system 120 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of computing device or system. For additional details regarding computing devices, refer to FIG. 6. For additional details regarding data processing systems 100, refer to FIG. 2A.

The system of FIG. 1 may include any number and types of data processing systems 100. Any of the aforementioned devices may operate independently and/or cooperatively to provide computer implemented services. Data processing systems 100 may provide such services to, for example, user of the data processing systems 100, to other data processing systems 100, and/or to other devices not shown in FIG.

In an embodiment, communication system 105 includes one or more networks that facilitate communication between data processing systems 100, startup management system 110, and authorization system 120. The networks may include, for example, wired networks, wireless network, public networks, private network, the Internet, etc.

While illustrated in FIG. 1 as included a limited number of specific components, a system in accordance with an embodiment may include fewer, additional, and/or different components than those illustrated therein.

Figure 2A:
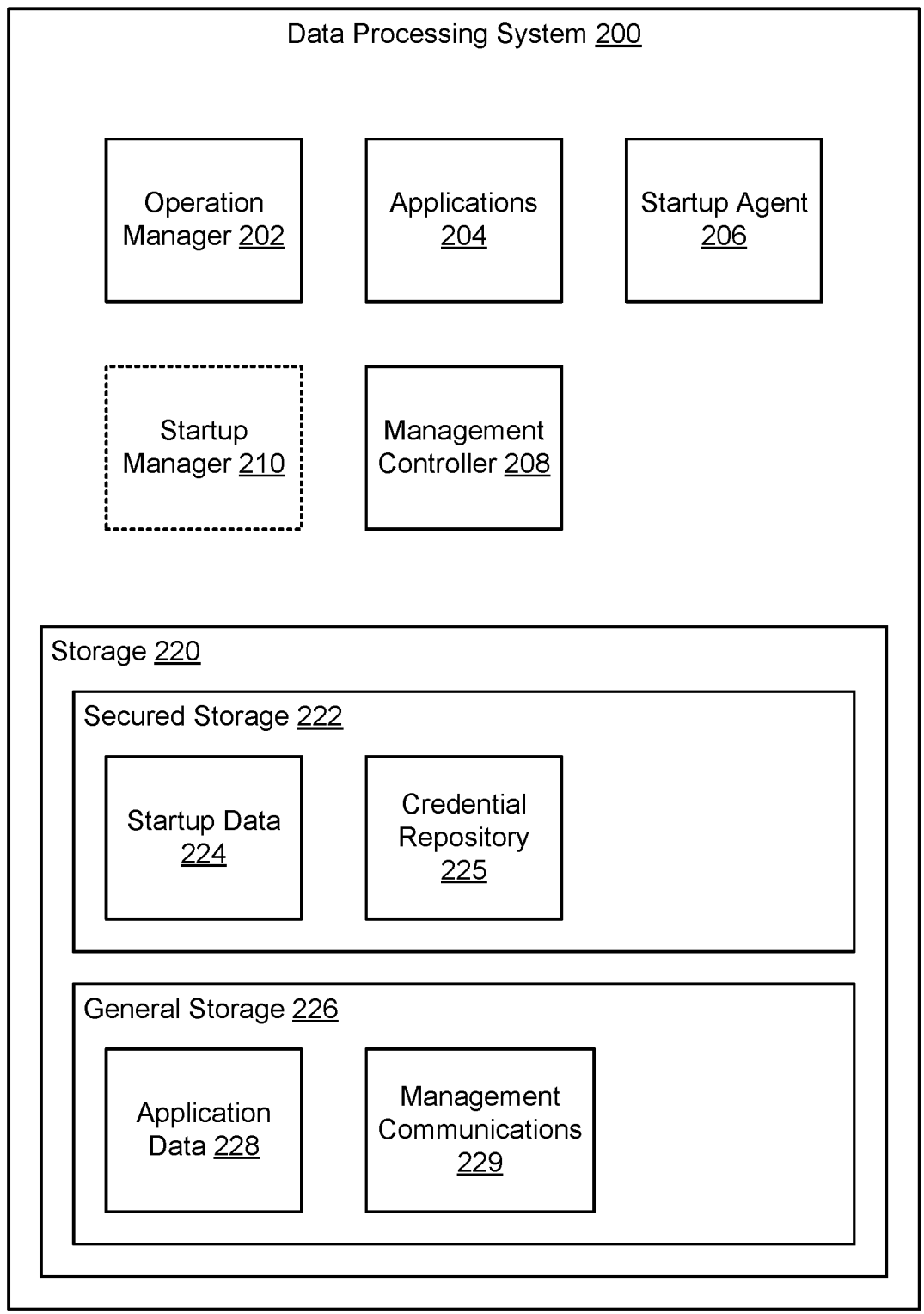
FIG. 2A shows a block diagram illustrating a data processing system in accordance with an embodiment.

Turning to FIG. 2A, a diagram of an example data processing system 200 in accordance with an embodiment is shown. Data processing system 200 may be similar to any of data processing systems 100.

Data processing system 200 may provide any number and type of computer implemented services. To provide the computer implemented services, data processing system 200 may enter into a predetermined operating state defined by startup data 224 stored in secured storage device 222 of storage 220. Startup data 224 may include different portions that allow for data processing system 200 to enter different operating states. To increase the likelihood of entering the predetermined operating state rather than other operating states, data processing system 200 may use a particular portion of startup data 224 by default. The other portions of startup data 224 may be restricted for use during startups and require a password or other type of credential to be supplied. Such passwords or other types of credentials may be stored in credential repository 225.

To provide its functionality, data processing system 200 may include operation manager 202, applications 204, startup agent 206, management controller 208, startup manager 210, and storage 220. Each of these components is discussed below.

Operation manager 202 may generally manage the operation of data processing system 200. Operation manager 202 may include, for example, an operating system, drivers, and/or other types of management entities. The function of operation manager 202 may change (and the components of operation manager 202) depending on the type of startup performed. By using other portions of startup data 224, operation manager 202 may perform different functions and include different components.

For example, operation manager 202 may include an operating system and drivers capable of supporting a broad array of applications and/or other entities. In another example, operation manager 202 may include limited functionality of an operating system or may cause the operating system to operate in certain modes of operation. Thus, the operation and components of operation manager 202 may depend on the type of startup performed.

Applications 204 may provide desired computer implemented services. When doing so, applications 204 may generate, store, modify, read, and/or otherwise use application data 228 stored in general storage 226. Applications 204 may only be present after certain types of startups are performed that cause operation manager 202 to provide certain functionalities (e.g., such as that of an entity capable of supporting the operation of various applications).

Startup agent 206 may provide communication management services. The communication management services may include (i) obtaining communications from startup management system 110 and/or other entities, (ii) forwarding such communications to management controller 208, and/or (iii) relaying communications between management controller 208 and authorization system 120.

Generally, applications 204 and startup agent 206 may provide their functionalities while data processing system 200 operates in the predetermined manner. For example, prior to completion of a startup, applications 204 and/or startup agent 206 may not provide their respective functionalities.

Startup manager 210 may provide startup management functionality. Startup management functionality may include selectively performing different types of startups using startup data 224. Additionally, startup manager 210 may restrict certain types of startups from being performed unless passwords or other credentials (e.g., copies of which may be stored in credential repository 225) are provided. Additionally, startup manager 210 may cooperate with management controller 208 to allow such restrictions to be bypassed. For example, startup manager 210 may treat management controller 208 as a trusted entity and may perform different startups as instructed by management controller.

In an embodiment, one or more of operation manager 202, applications 204, startup agent 206, and startup manager 210 is implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 202, applications 204, startup agent 206, and startup manager 210. One or more of operation manager 202, applications 204, startup agent 206, and startup manager 210 may be implemented using other types of hardware devices without departing from embodiments disclosed herein.

In an embodiment, one or more of operation manager 202, applications 204, startup agent 206, and startup manager 210 is implemented using a processor adapted to execute computing code stored on a persistent storage that when executed by the processor performs the functionality of one or more of operation manager 202, applications 204, startup agent 206, and startup manager 210 discussed throughout this application. The processor may be a hardware processor including circuitry such as, for example, a central processing unit or a microcontroller. The processor may be other types of hardware devices for processing digital information without departing from embodiments disclosed herein.

Figure 3A:
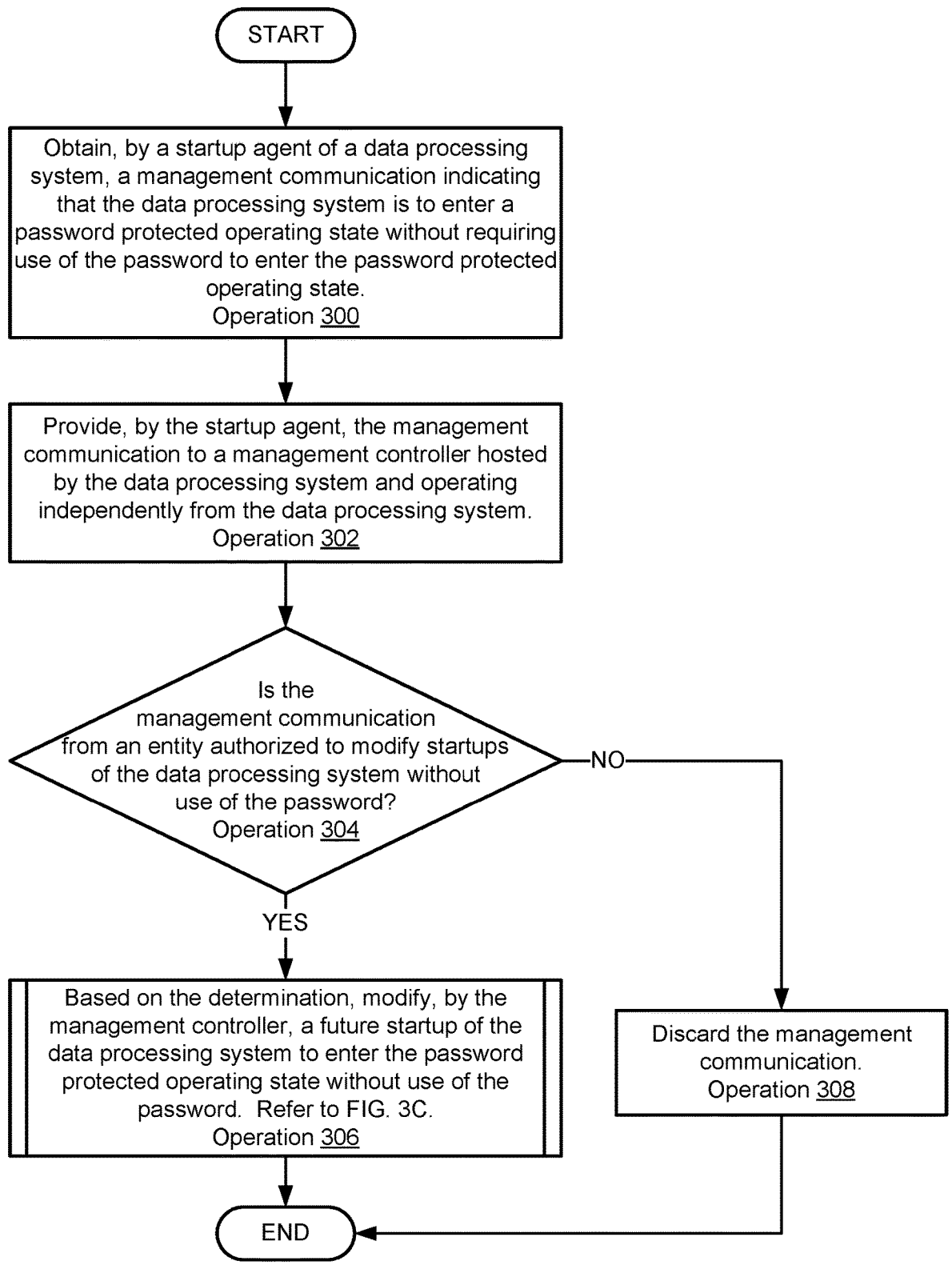
FIG. 3A shows a flow diagram illustrating a method of managing startups of a data processing system in accordance with an embodiment.
Figure 3B:
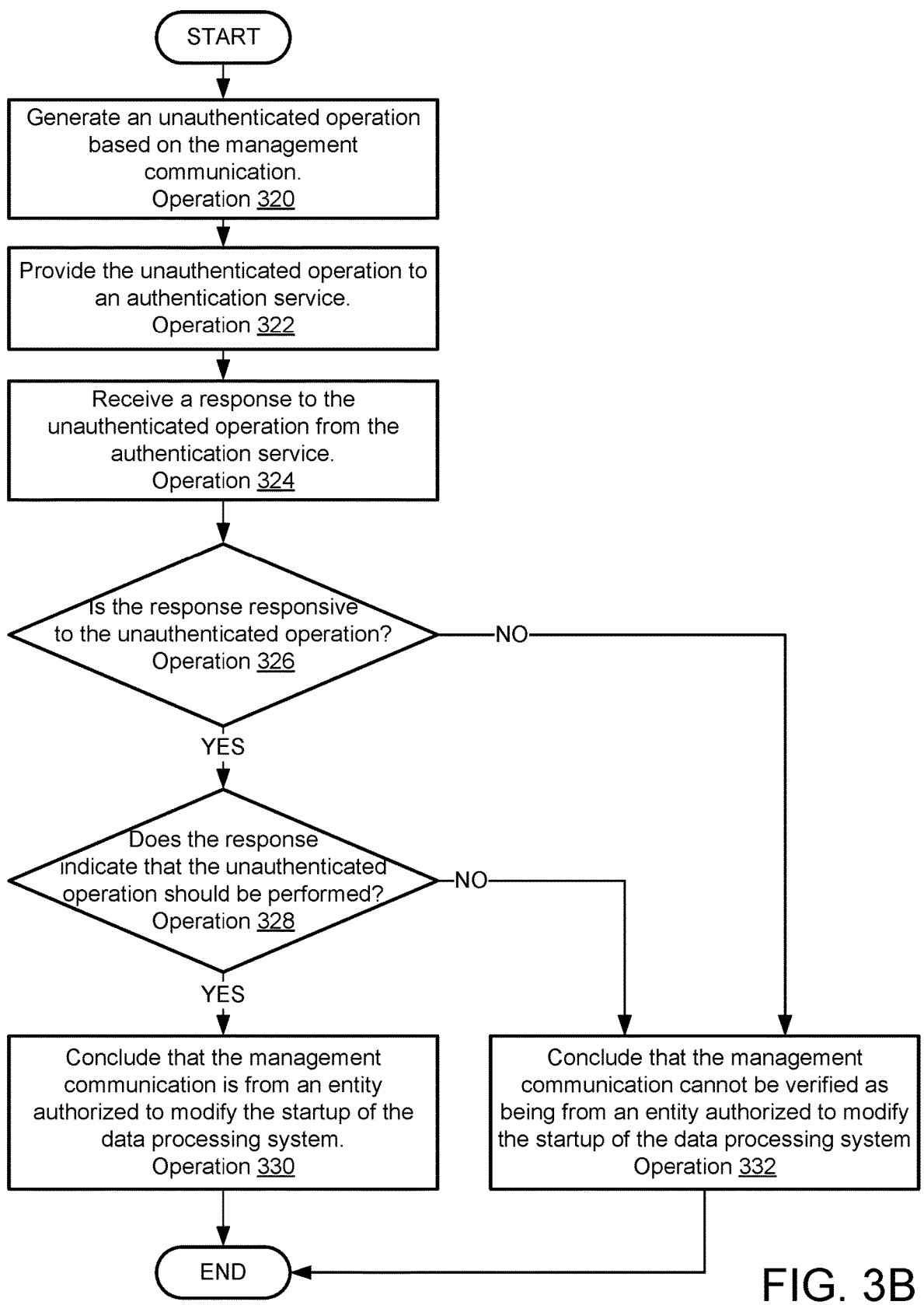
FIG. 3B shows a flow diagram illustrating a method of determining whether a management communication is from an authorized entity in accordance with an embodiment.
Figure 3C:
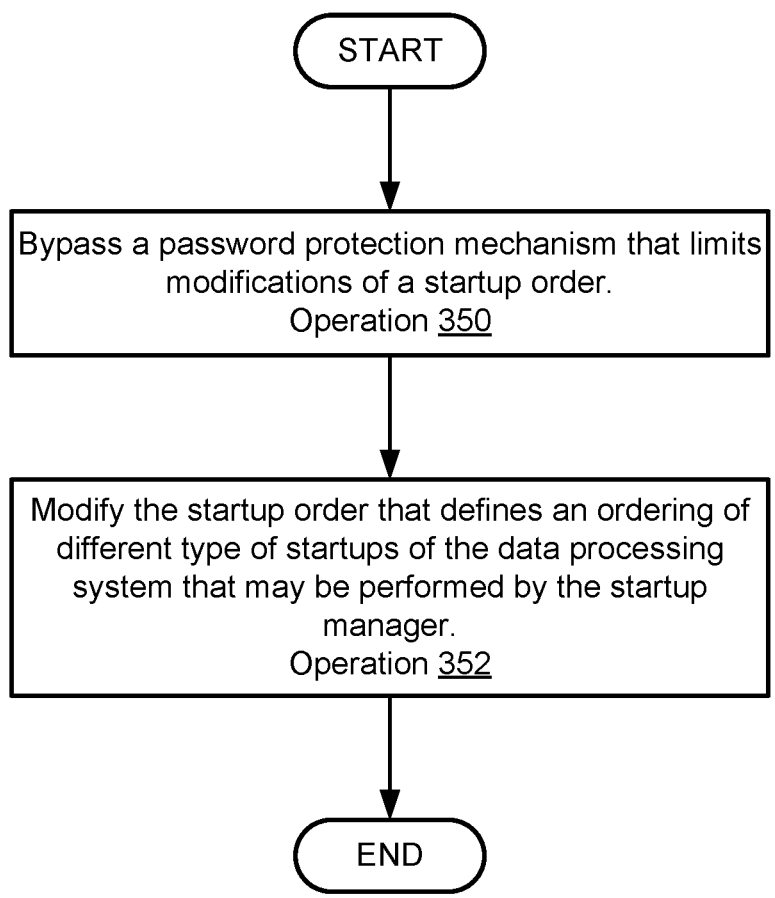
FIG. 3C shows a flow diagram illustrating a method of modifying a startup of a data processing system in accordance with an embodiment.

When providing their functionalities, one or more of operation manager 202, applications 204, startup agent 206, and startup manager 210 may perform all, or a portion, of the methods illustrated in FIGS. 3A-3C.

Management controller 208 may provide startup management services. Startup management services may include (i) obtaining communications from other entities indicating that data processing system 200 is to start operating in a certain manner, (ii) authenticate the communications and/or instructions therein, and (iii) for authenticated communications/instructions, cause data processing system 200 to operate in accordance with the communications/instructions without use of passwords normally required by startup manager 210 to perform startups corresponding to the indicated operating states. By doing so, management controller 208 may allow for data processing system 200 to enter any number of password restricted operating states without requiring that the password, which normally restricts access to those operating states, or other credential be provided. Consequently, administrators or other persons tasked with managing data processing system 200 may be able to cause data processing system 200 to enter particular operating states without requiring that the administrators have access to the passwords or other credentials normally used to restrict the operation of data processing system 200.

To obtain communication from other entities, management controller 208 may cooperate with startup agent 206. For example, startup may receive such communications and relay them to management controller 208 (which may appear to be a separate network end point from that of data processing system 200 in some embodiments, discussed below).

To authenticate communications and/or instructions therein, management controller 208 may cooperate with authorization system 120. For example, management controller 208 may send a communication to authorization system 120 (e.g., over a secured channel, encrypted, etc.). The communication may indicate the communication/instruction received, may include authentication data for the communication/instruction, and/or may include security information (e.g., session identifiers, one-time tokens, time stamps, etc.) usable by management controller 208 to thwart various types of attacks such as replay attacks and/or other types of man-in-the-middle attacks. Authorization system 120 may send responses to the communications indicating whether the communications/instructions should be trusted and/or implemented.

In an embodiment, management controller 208 uses startup agent 206 to relay communications to and from authorization system 120. In other embodiments, management controller 208 is operably connected to authorization system 120 via a separate network interface (e.g., from that of data processing system 200). In such a scenario, management controller 208 may send and receive communications with authorization system 120 without relaying them through startup agent 206.

To cause data processing system 200 to operate in accordance with the communications/instructions, management controller 208 may instruct startup manager 210 to perform different type of startups corresponding to the operating states indicated by the communication/instructions. For example, management controller 208 may specify an order associated with the different types of startups that may be performed. The order may indicate which of the startups will be performed. Consequently, a particular type of startup may be performed when startup order is appropriately set. Management controller 208 may be trusted by startup manager 210 and, therefore, may not be required to supply a password that normally restricts access to changes in the startup order.

In an embodiment, management controller 208 is implemented with an in band and/or out of band management controller hosted by data processing system 200. For example, management controller 208 may be implemented with a separate, independently operating computing device operably connected to the components (e.g., processors, memory modules, storage devices, etc.) of data processing system 200 via one or more communication interfaces. The one or more communication interfaces may allow management controller 208 to communication with startup manager 210, startup agent 206, and/or other entities hosted by data processing system 200.

In an embodiment, management controller 208 implements a secured communication system. The secured communication systems may limit the types of communications, quantities of communications, formats of communications, and/or other aspects of communication between management controller 208 and startup manager 210. For example, management controller 208 may implement a mailbox system or other type of virtualized (or software defined) communication end point scheme such that management controller 208 may appear to be a separate device to data processing system 200 (and/or other entities such as, for example, authorization system 120). To communicate with management controller 208, startup agent 206 and/or other entities may send communications to an end point associated with management controller 208.

Management controller 208 may operate independently of data processing system 200 and/or invoke various functionalities of data processing system 200 to provide all, or a part, of its functionality. For example, to communicate with other devices, management controller 208 may utilize communication hardware of data processing system 200 (e.g., by relaying communications through startup agent 206).

Figure 2B:
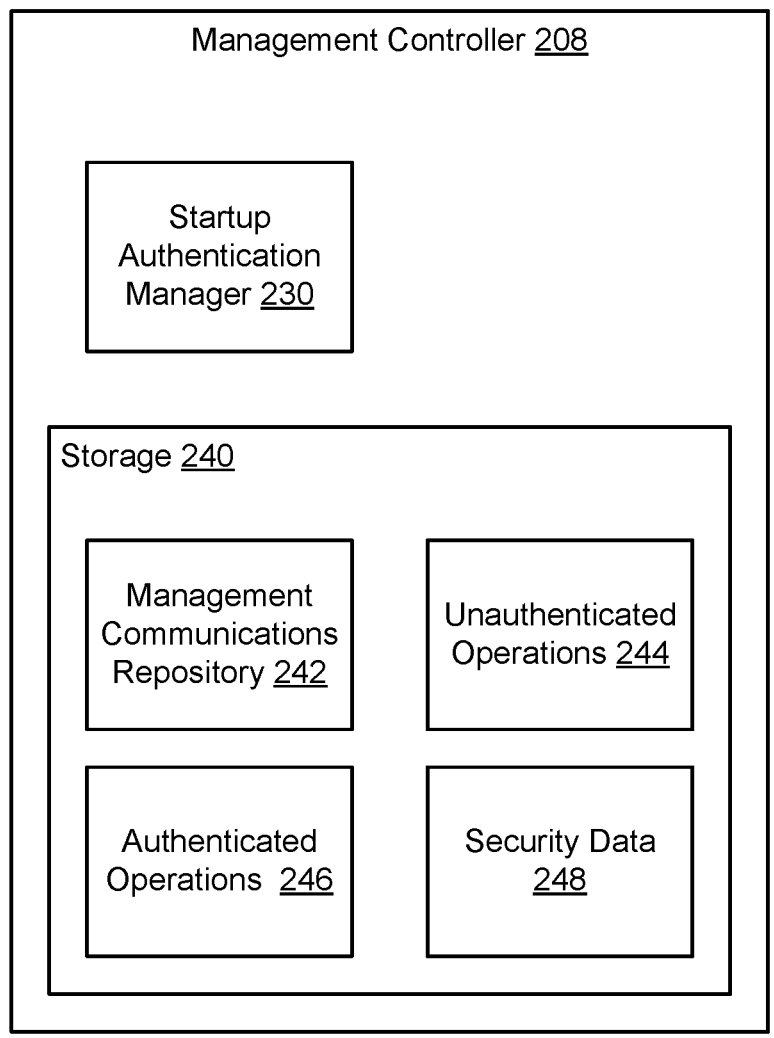
FIG. 2B shows a block diagram illustrating a management controller in accordance with an embodiment.

For additional details regarding management controller 208, refer to FIG. 2B and the corresponding discussion.

When providing its functionality, management controller 208 may perform all, or a portion, of the methods illustrated in FIGS. 3A-3C.

In an embodiment, storage 220 is implemented using physical devices that provide data storage services (e.g., storing data and providing copies of previously stored data). The devices that provide data storage services may include hardware devices and/or logical devices. For example, storage 220 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 220 may include a memory device (e.g., a dual in line memory device) in which data is stored and from which copies of previously stored data are provided. In another example, storage 220 may include a persistent storage device (e.g., a solid-state disk drive) in which data is stored and from which copies of previously stored data is provided. In a still further example, storage 220 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 220 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

In an embodiment, storage 220 is implemented with secured storage 220. Secured storage 220 may include a hardware storage device for storing data. Secured storage 220 may only be accessible by startup manager 210. For example, secured storage 220 may be implemented with a solid state storage device operably connected via a serial peripheral interface bus to a processor of data processing system 200. Upon startup, data processing system 200 may cause the information in the solid state storage device to be used to perform startup of data processing system 200. For example, instructions (e.g., computer code) corresponding to startup manager 210 may be stored in startup data 224. The contents of the solid state storage device may be generally inaccessible without providing various credentials such as passwords.

Startup data 224 may include any type and quantity of data for performing any number and type of startups of data processing system 200. Startup data may also include a listing of an order or other indicators that define which of the types of startups will be performed.

Credential repository 225 may include any type and quantity of data for restricting access to the various types of startups that may be performed by startup manager 210. In an embodiment, credential repository 225 includes, for example, passwords which restrict access to certain types of startups. For example, a password may need to be provided for a preference order of the startups that may be performed by startup manager 210. To change the order, a copy of the password may need to be provided which may be matched against that stored in credential repository 225.

Credential repository 225 may also include, for example, identifiers of entities, security tokens, and/or other types of information. Entities that are either identified by and/or supply copies of this information may be allowed to change the startup preference order without being required to provide a password. In other words, the other information may be used to bypass the password restriction with respect to some of the startups that may be performed by startup manager 210. In an embodiment, credential repository 225 includes an identifier of management controller 208, or other information, such that management controller 208 may modify the startup to be performed by startup manager 210 without needing access to, to provide, or otherwise us a password.

In an embodiment, storage 220 is implemented with general storage 226. General storage 226 may include any number and types of storage devices. General storage 220b may be accessible. For example, operation manager 202 may manage and provide access to data stored in general storage 226.

Application data 228 may include any type and quantity of data used by applications 204 to provide their respective services.

Management communications 229 may include any type and quantity of data regarding communications received by startup agent 206 indicating that startup manager 210 should perform a password restricted (or otherwise restricted) startup of data processing system 200. Management communications 229 may also include copies of communications relayed on behalf of management controller 208 (e.g., in a scenario where management controller 208 is unable to independently send communications).

While illustrated in FIG. 2A as including a limited number of specific components, a data processing system in accordance with an embodiment may include fewer, additional, and/or different components than shown herein.

Turning to FIG. 2B, a diagram of management controller 208 in accordance with an embodiment is shown. As discussed above, management controller 208 may provide startup management service. To provide its functionality, management controller 208 may include startup authentication manager 230 and storage 240. Each of these components is discussed below.

Startup authentication manager 230 may manage startup performed by a host data processing system. To provide the startup management services, startup authentication manager 230 may (i) obtain communications indicating changes in startups to be performed by the host data processing system, (ii) authenticate the communications and/or instructions therein, and (iii) for authenticated communications and/or instructions, cause the host data processing system to perform corresponding startups. By doing so, management controller 208 may allow password (or other type of restrictions) restricted startups to be performed without requiring the password.

In an embodiment, startup authentication manager 230 is implemented using a hardware device including circuitry. The hardware device may be, for example, a digital signal processor, a field programmable gate array, or an application specific integrated circuit. The circuitry may be adapted to cause the hardware device to perform the functionality of startup authentication manager 230. Startup authentication manager 230 may be implemented using other types of hardware devices without departing from embodiments disclosed herein.

In an embodiment, startup authentication manager 230 is implemented using a processor adapted to execute computing code stored on a persistent storage that when executed by the processor performs the functionality of startup authentication manager 230 discussed throughout this application. The processor may be a hardware processor including circuitry such as, for example, a central processing unit or a microcontroller. The processor may be other types of hardware devices for processing digital information without departing from embodiments disclosed herein.

When providing its functionalities, startup authentication manager 230 may perform all, or a portion, of the methods illustrated in FIGS. 3A-3C.

In an embodiment, storage 240 is implemented using physical devices that provide data storage services (e.g., storing data and providing copies of previously stored data). The devices that provide data storage services may include hardware devices and/or logical devices. For example, storage 240 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 240 may include a memory device (e.g., a dual in line memory device) in which data is stored and from which copies of previously stored data are provided. In another example, storage 240 may include a persistent storage device (e.g., a solid-state disk drive) in which data is stored and from which copies of previously stored data is provided. In a still further example, storage 240 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 240 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 240 may store data structures including management communications repository 242, unauthenticated operations 244, authenticated operations 246, and security data 248. Each of these data structures is discussed below.

Management communications repository 242 may include one or more data structures that include information regarding communications received that indicate a change in startup of a host data processing system. The communications may be received, for example, by a startup agent of the host managed system and provided to management controller 208. The communications and instructions therein may not have been authenticated.

Unauthenticated operations 244 may include one or more data structures that include operations to be performed by a host data processing system. For example, when a communication of management communications repository 242 is received, a corresponding unauthenticated operation may be generated. Each of the unauthenticated operations may then be packaged with authentication or security data from the communications and provided to an authentication service for verification. Additionally, the unauthenticated operation may include security data to prevent replay attacks or other types of man in the middle types of attacks.

Authenticated operations 246 may include one or more data structures that include operations from unauthenticated operations 244 that have been authenticated by a security service. For example, when an unauthenticated operation is provided to the authentication service, the authentication and/or security data may be used by the authentication service to determine whether a trusted entity initiated the unauthenticated operations. The authentication service may do so via any process such as, for example, comparing the authentication data to similar data for registered entities (e.g., that have registered with the authentication service). The authentication service may sign (or otherwise indicate authenticity) the unauthenticated operations if they are from a trusted entity. The signed unauthenticated operations may be returned to management controller 208 as authentication operations 246.

Security data 248 may include one or more data structures that include information usable to secure communications between management controller 208 and authentication services. For example, security data 248 may include keys used to secure communications between the entities, time stamps or other types of information associated with various unauthenticated operations 244 usable to prevent replay or other types of man in the middle attacks, and/or other types of information usable to reduce the likelihood of the functionality of management controller 208 from being compromised.

In an embodiment, security data 248 also includes tokens or other data structures with which it authenticates its commands to a startup manager of a host data processing system. For example, when authenticated operations 246 are obtained, startup authentication manager 230 may cause them to be implemented by providing them to a startup manager of a host data processing system. Copies of the tokens or other data structures (e.g., derived from them) may be provided along with these authenticated operations so that the startup manager is able to identify that they should be implemented without needing passwords or other types of credentials.

The data structures stored in storage 240 may be implemented using, for example, lists, tables, unstructured data, trees, databases, etc. While illustrated in FIG. 2B as being stored locally, the data structures may be stored remotely and may be distributed across any number of devices without departing from embodiments disclosed herein.

While illustrated in FIG. 2B as including a limited number of specific components, a management controller in accordance with an embodiment may include fewer, additional, and/or different components than shown herein.

Figure 2C:
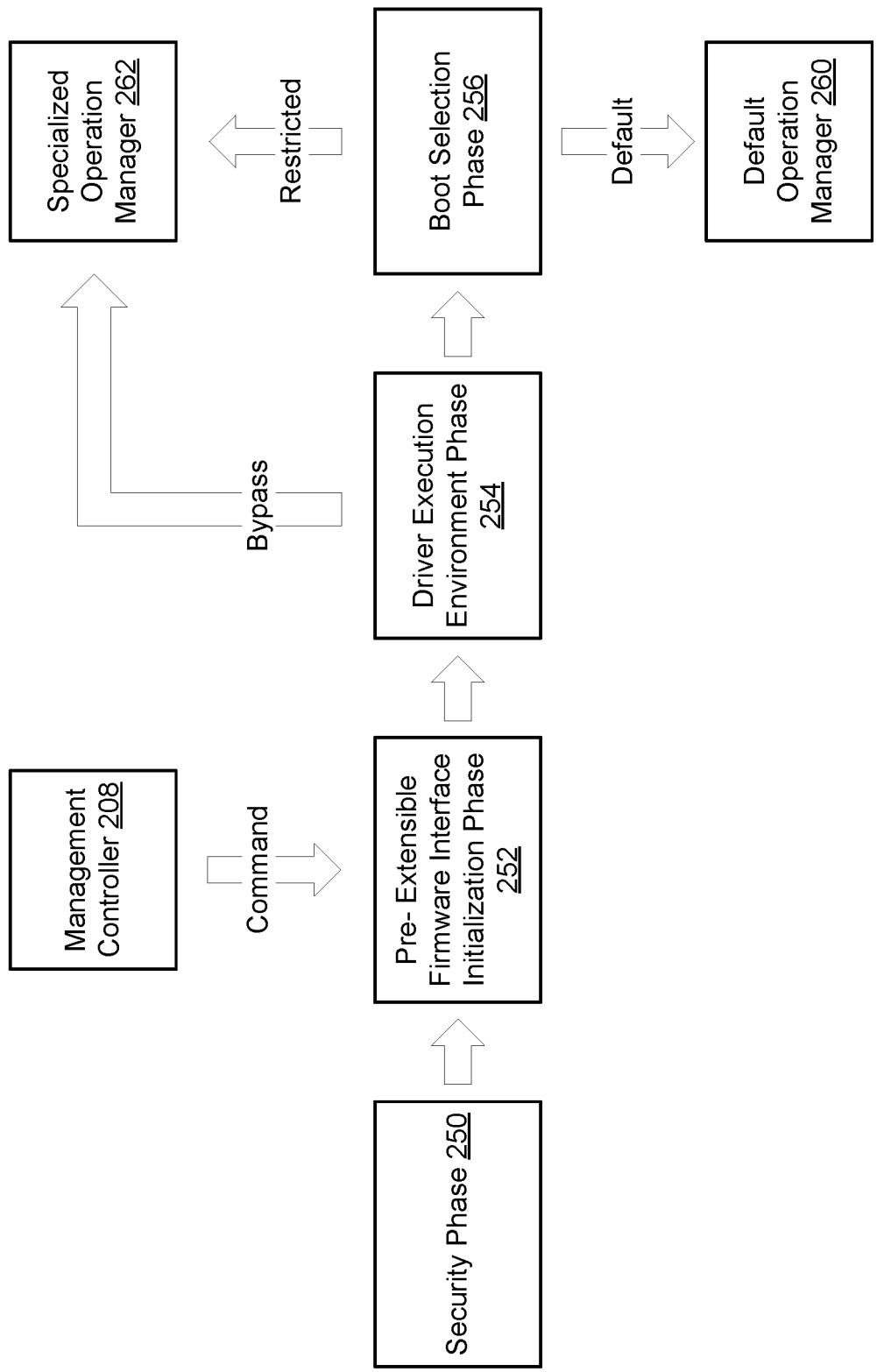
FIG. 2C shows a block diagram illustrating a startup process for a data processing system in accordance with an embodiment.

As discussed above, management controller 208 may selectively cause data processing systems to perform password restricted boots without using the passwords. FIG. 2C shows a diagram illustrating a boot process in accordance with an embodiment.

Generally, a startup manager may perform various phases 250, 252, 254, 256 until handoff to a management entity (e.g., 262, 260). Management controller 208 may send a command to the startup manager during these phases to bypass one of the phases that may restrict access to handing off operation to some of the management entities.

For example, the phases may include security phase 250, pre-extensible firmware interface initialization phase 252, driver execution environment phase 254, and boot selection phase 256. These phases may be performed sequentially.

Boot selection phase 256 may facilitate handing off operation of the data processing system to varying management entities. For example, the management entities may include default operation manager 260 (e.g., a general purpose operating system) and specialized operation manager 262 (e.g., an operating system designed for specific purposes such as service, which may be quick to load, have fewer dependencies than a general purpose operating system, have different capabilities than a general purpose operating system, etc.). Boot selection phase 256 may facilitate handoff to any number of management entities.

Handoff to some of the management entities may be restricted. For example, as indicated by the arrow between boot selection phase 256 and specialized operation manager, a password or other credential may need to be provided to handoff to specialized manager. In contrast, handoff to default operation manager 260 may not require use of a password or other credential.

During pre-extensible firmware interface initialization phase 252, management controller 208 may send a command (e.g., a "fast boot command") to the startup manager. The command may indicate that management of the data processing system should be handed off to a restricted management entity (e.g., 262). If such a command is received during this phase, then boot selection phase 256 may be bypassed following driver execution environment phase 254 and handoff to the restricted management entity may be performed.

By doing so, the duration of time to handoff operation of a data processing system to a management entity may be reduced. Consequently, a startup may be completed more quickly.

As discussed above, the components of FIG. 1 may perform various methods to increase the likelihood of data processing systems being able to enter predetermined manners of operating that are typically password restricted without requiring use of passwords. FIGS. 3A-3C illustrate examples of methods that may be performed by the components of FIG. 1. In the diagrams discussed below and shown in these figures, any of the operations may be repeated, performed in different orders, and/or performed in parallel with or a partially overlapping in time manner with other operations.

Turning to FIG. 3A, a flow diagram illustrating a method of modifying startups in accordance with an embodiment is shown. The method may be performed, for example, by a data processing system.

At operation 300, a management communication may be obtained by a startup agent of the data processing system. The management communication may indicate that the data processing system is to enter a password protected operating stat without requiring use of the password to enter the password protected operating state.

The management communication may be obtained by receiving it via a network communication. The management communication may not be trusted. For example, the management communication may be treated as potentially being inauthentic (e.g., forged).

At operation 302, the management communication is provided to a management controller. The management controller may be hosted by the data processing system. The management controller may operate independently from the host data processing system.

The management communication may be provided to the management communication via any communication scheme. For example, the management communication may be sent via a message, may be stored in a particular storage location that the management controller checks to such communications, etc.

At operation 304, a determination is made regarding whether the management communication is from an entity authorized to modify startups of the host data processing system without use of the password. For example, certain entities may be authorized to modify the startups of the host data processing system without use of corresponding passwords.

To make the determination, the management controller may (i) generate an unauthenticated operation, (ii) add security information, (iii) provide the unauthenticated operation and security information to an authentication service (e.g., via a secured communication channel that may be secured via a public-private key exchange or other method of generating a shared secret through which session keys may be derived), and (iv) receive a response indicating whether the unauthenticated operation should be implemented (e.g., is from a trusted entity). The determination may be made based on the response from the authentication service.

In an embodiment, the determination is made by perform the method illustrated in FIG. 3B.

If it is determined that the management communication is from an authorized entity, then the method may proceed to operation 306. Otherwise, the method may proceed to operation 308. Proceeding to operation 308 may indicate that the management communication is believed to be inauthentic.

At operation 306, based on the determination, a future startup of the host data processing system is modified so that it enters the password protected operating state without use of the password.

In an embodiment, the future startup is modified, without use of the password, by (i) interrupting a next default startup performed, (ii) changing a startup order, and (iii) resuming the default startup after changing the startup order so that the next default startup is modified to correspond to a startup that results in the host data processing system entering the password protected operating state. The startup order may be changed by sending a communication indicating the change in startup order to the startup manager of the data processing system. In an embodiment, the future startup is modified by changing the startup order prior to the next default startup being performed. For example, a communication indicating the change in the startup order may be sent via a mailbox or other communication scheme such that the startup manager reads it prior to performing its next startup. The contents of the communication may indicate the change in the startup order and may also include such information that the startup manager implements the change in startup order without use of the password (or other credential that may restrict access to modifications in the startup order.

Consequently, the next startup performed may be a password protected startup that is performed without the password.

In an embodiment, the future startup is modified by performing the method illustrated in FIG. 3C.

The method may end following operation 306.

Returning to operation 304, the method may proceed to operation 308 following operation 304 when it is determined that the management communication is not from an authorized entity.

At operation 308, the management communication is discarded. The management communication may be discarded without implementing it.

The method may end following operation 308.

Turning to FIG. 3B, a flow diagram illustrating a method of determining whether a management communication is authentic in accordance with an embodiment is shown. The method may be performed, for example, by a data processing system (e.g., via a host management controller).

At operation 320, an unauthenticated operation is generated based on the management communication. The unauthenticated operation may include an instruction to perform a password (or other credential) restricted startup, authentication information (e.g., from the management communication), and security information usable to prevent or reduce the likelihood of various man in the middle attacks being successfully performed.

In an embodiment, the security information may be a keyed-hash message authentication code (HMAC). The HMAC may be generated by using a random nonce and an identifier of the management controller (e.g., calculating a hash of the nonce+the identifier).

At operation 322, the unauthenticated operation is provided to an authentication service. The unauthenticated operation may be provided by sending it via a secure communication channel as part of one or more messages.

In an embodiment, the unauthenticated operation is relayed via a startup agent.

In an embodiment, the unauthenticated operation is sent via an out of band channel.

At operation 324, a response from the authentication service is received. The response may indicate whether the unauthenticated operation is to be performed.

Operations 322 and 324 may be performed by sending and/or received messages via a secure communication channel between the management controller and the authentication service.

At operation 326, it is determined whether the response is responsive to the unauthenticated operation. The determination may be made by comparing security information included in the response to that included in the transmitted unauthenticated operation. For example, a session identifier and/or component identifier (e.g. a number) may be added as security information. The session between the management controller and authentication service may be changed frequently enough to prevent other parties it from deriving it even in an unsecure environment. Consequently, the session identifier may be sufficient to serve as proof that a communication has not been forged by another party (e.g., which may sniff password hashes and replay them to make parties to the communications believe that the forged communications are authentic).

If it is determined that the response is responsive to the unauthenticated operation (e.g., not a forged communication), then the method may proceed to operation 328. Otherwise, the method may proceed to operation 332.

In operation 328, a determination is made regarding whether the response indicates that the unauthenticated operation should be performed. The determination may be made based on whether the response is a signed copy of the unauthenticated operation. Signing, by the authentication service, may indicate that the authentication service believes that the management communication is from a trusted entity. If the authentication service believes that the management communication is from a trusted entity, then it may be determined that response indicates that the unauthenticated operation should be performed.

If it is determined that the response indicates that the unauthenticated operation should be performed, then the method may proceed to operation 330. Otherwise, the method may proceed to operation 332.

At operation 330, the management communication is concluded to be from an entity authorized to modify the startup of the data processing system. Consequently, the management controller may proceed to implement the unauthenticated operation (e.g., which has now been authenticated).

The method may end following operation 330.

Returning to operations 326 and 328, the method may proceed to operation 332 following operations 326 and 328 if the authenticity of the unauthenticated operation cannot be determined (e.g., following the NO paths).

In operation 332, the management communication is concluded as being unable to be verified as being from an entity authorized to modify the startup of the data processing system.

The method may end following operation 332.

Turning to FIG. 3C, a flow diagram illustrating a method of modifying a startup in accordance with an embodiment is shown. The method may be performed, for example, by a data processing system (e.g., via a host management controller).

At operation 350, a password protection mechanism that limits modifications of a startup order is bypassed. The password protection mechanism may be bypassed by, for example, indicating an identity of the management controller to the startup entity. For example, an identify, token, or other data structure (e.g., derived from a shared secret) may be provided to the startup management entity.

At operation 352, the startup order that defines an ordering of different types of startup of the host data processing system that may be performed by the startup manager is modified. The startup order may be modified by sending a now authenticated operation to the startup manager. The authenticated operation may indicate the change in the startup order such that a password restricted startup will be performed (e.g., rather than a default startup). Operation 352 may be performed while the password protection mechanism is bypassed. For example, the authenticated operation may be included along with the identifier or other data structure that causes the password protection mechanism to be bypassed.

The method may end following operation 352.

To further clarify embodiments disclosed herein, a process of modifying a startup of a data processing system in accordance with embodiments is illustrated in FIGS. 4A-5C. In FIGS. 4A-5C, diagrams illustrating components of a system similar to FIG. 1 are illustrated, along with actions and interactions between various components. In the figures, actions and interactions are illustrated with numbered blocks (e.g., 1-16) and flows of data, communications, instructions, etc. between these components are indicated with arrows having dashed tails. In some of the figures, only a selection of components is shown, but the components may be understood as including additional components not illustrated here.

Figure 4A:
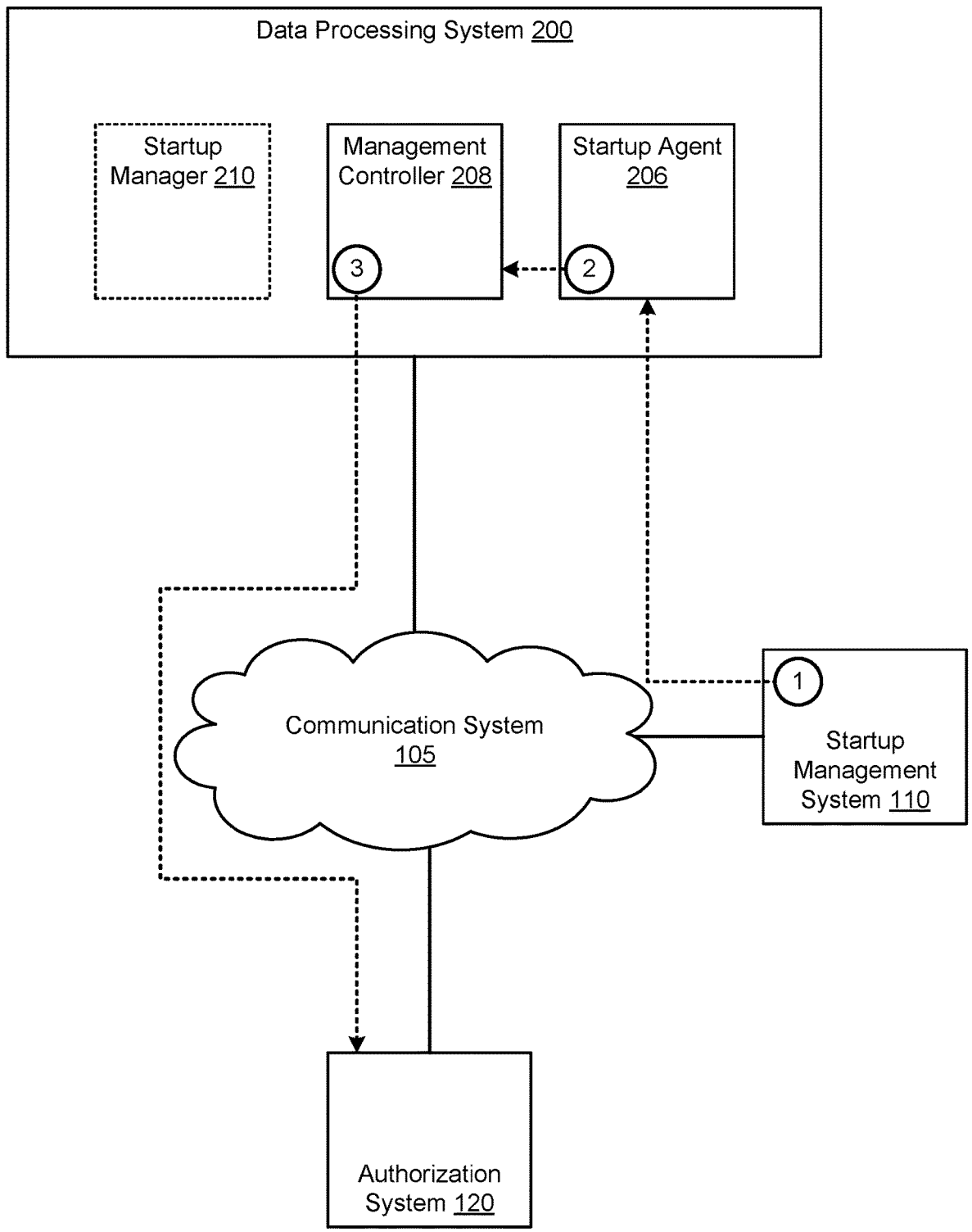
FIGS. 4A-5C show diagrams of a system over time in accordance with an embodiment.

Now, turning to FIG. 4A, consider a scenario where data processing system 200 runs into an error that causes its applications (not shown) to no longer function correctly. To diagnose the issue, an administrator or other person may be assigned to manage the data processing system. Upon inspection, the administrator may identify that data processing system 200 may need to perform a startup to enter a recovery operating state rather than a default or normal operating state. However, data processing system 200 may restrict access to its startup procedure and require a password to be provided for a startup to enter the recovery operating state to be performed. The administrator may not have access to the password and, therefore, may not be able to change the type of startup performed by data processing system 200.

To address the lack of the password, the administrator may use a computing device (not shown) to request that startup management system 110 restart data processing system 200 in a manner that will result in it entering the rescue operating state. In response, at block 1, startup management system 110 may send a management communication to startup agent 206 requesting that a password protected startup associated with the rescue operating state be performed. The management communication may also include authentication information. Because startup management system 110 previously registered with authorization system 120, management controller 208 may authenticate its communications using authorization system 120.

In response, at block 2, startup agent 206 may provide the communication to management controller 208. After receiving the management communication, management controller 208, at block 3, may seek to authenticate the management communication. To do so, management controller 208 may establish a (or use an existing) secure communication channel to authorization system 120. Management controller 208 may generate an unauthenticated operation, and send it along with the authentication information (and/or security information to prevent man in the middle attacks) from the management communication to authorization system 120.

Figure 4B:
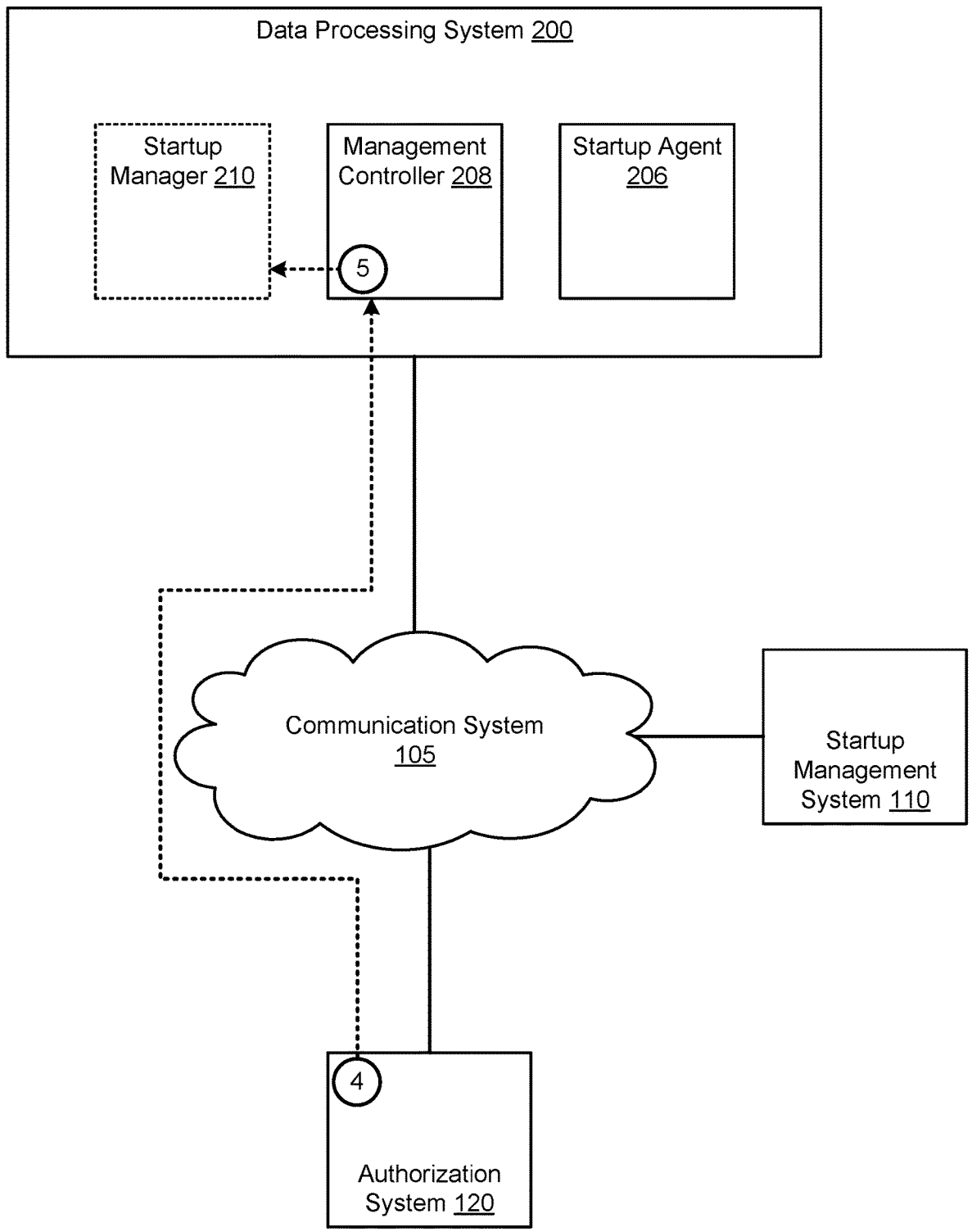

Turning to FIG. 4B, at block 4, authorization system 120 is able to authenticate the unauthenticated operation using the authentication data (e.g., the authentication data may include information usable by authorization system 120 to determine that the operation is initiated by startup management system 110). Accordingly, authorization system signs the unauthenticated operation (thereby authenticating it) and sends it back to management controller 208 via the secure channel.

At block 5, management controller 208 identifies that the unauthenticated operation has been authenticated, and instructs startup manager 210 to perform the operation. In FIGS. 4A-4B, startup manager 210 is drawn with a dashed outline to indicate that it may not be operating while these actions are taking place. To instruct startup manager 210 to perform the operation, management controller 208 may send corresponding instructions to startup manager 210 prior to and/or during a startup.

Figure 4C:
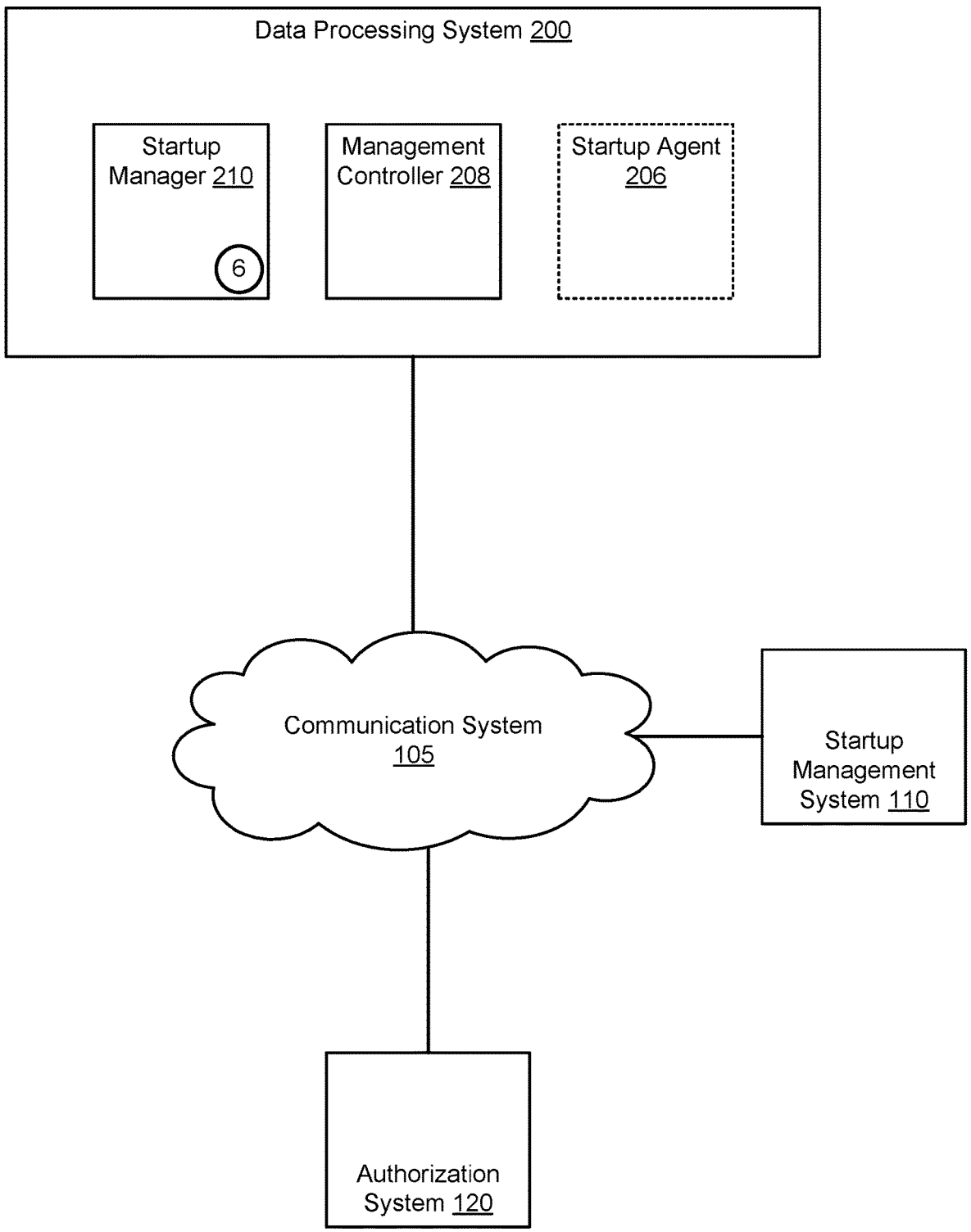

Turning to FIG. 4C, startup manager 210, during the next startup, identifies that a startup corresponding to the rescue operating state is to be performed, and that the instructions are from management controller 208. Consequently, startup manager 210 does not require the password to be provided an initiates performance of the corresponding startup. In FIG. 4C, startup agent 206 is drawn with dashed outline to indicate that it may not be operating during the startup.

Figure 4D:
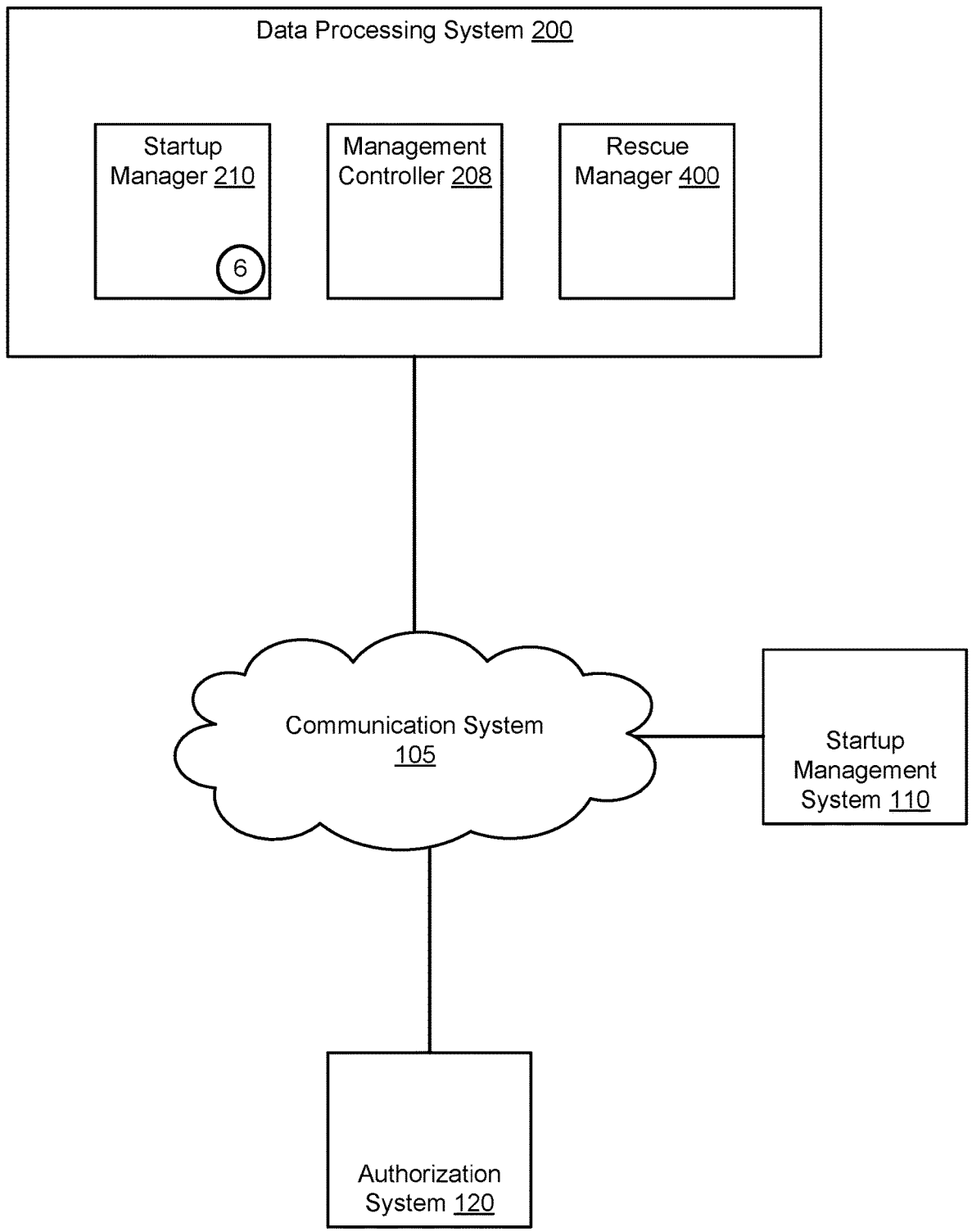

Turning to FIG. 4D, after performing the startup, rescue manager 400 is present and able to provide the necessary support to remediate the operation of data processing system 200. Rescue manager 400 (e.g., may be referred to as a service manager) may be adapted to modify operation of data processing system 200 by, for example, modifying the data used by startup manager 210 to perform various startups thereby modifying performance of future startup. Consequently, data processing system 200 may be rescued. Upon completion of the rescue, data processing system 200 may be restarted which may cause a default startup to be performed thereby resulting in it entering its normal operating state.

In FIGS. 4A-4D, management controller 208 is described as being capable of communicating with authorization system 120. However, management controller 208 may not always be able to do so. For example, in an embodiment, management controller 208 does not include functionality, separate from that of data processing system 200, to communicate with other devices.

Figure 5A:
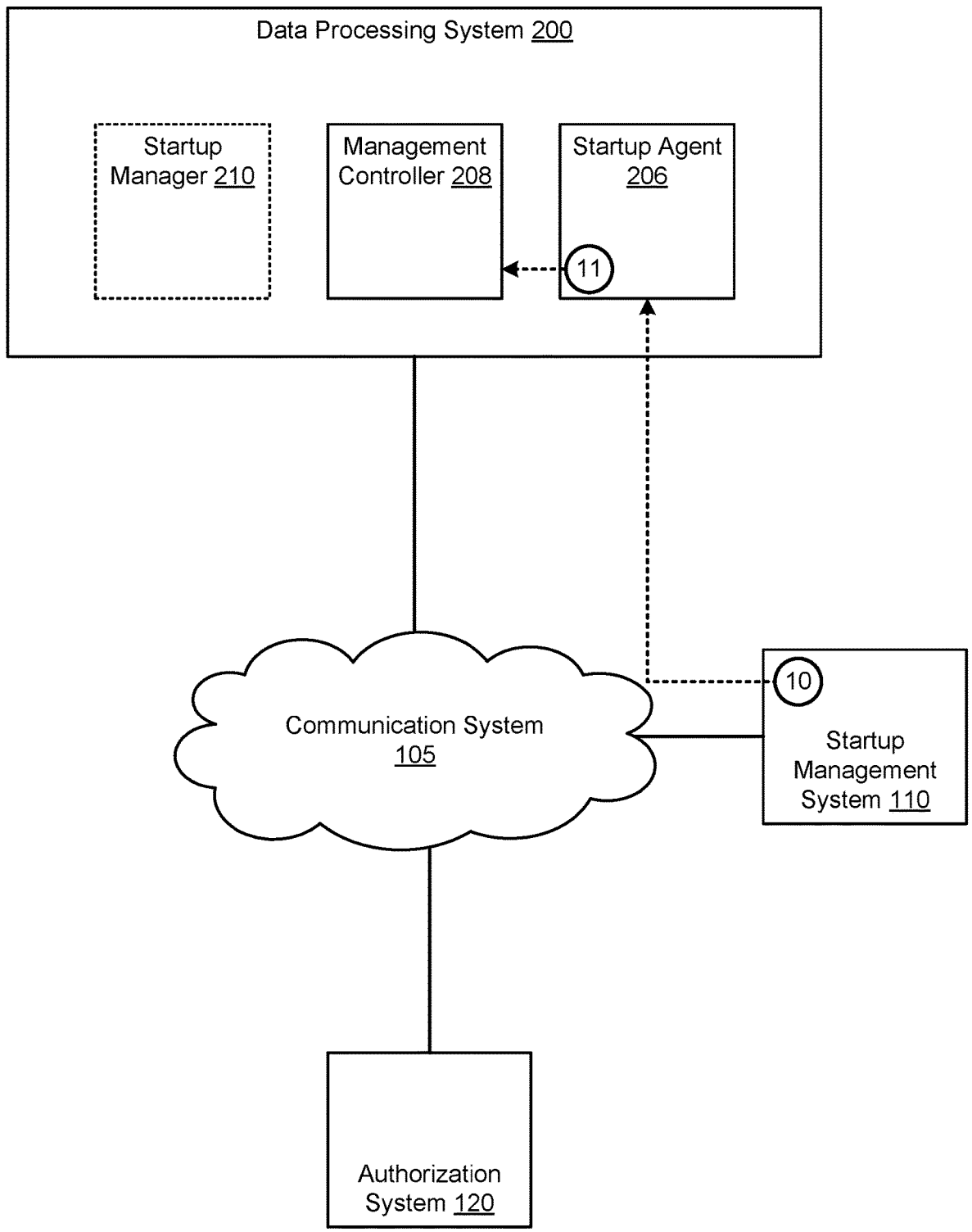
Figure 5B:
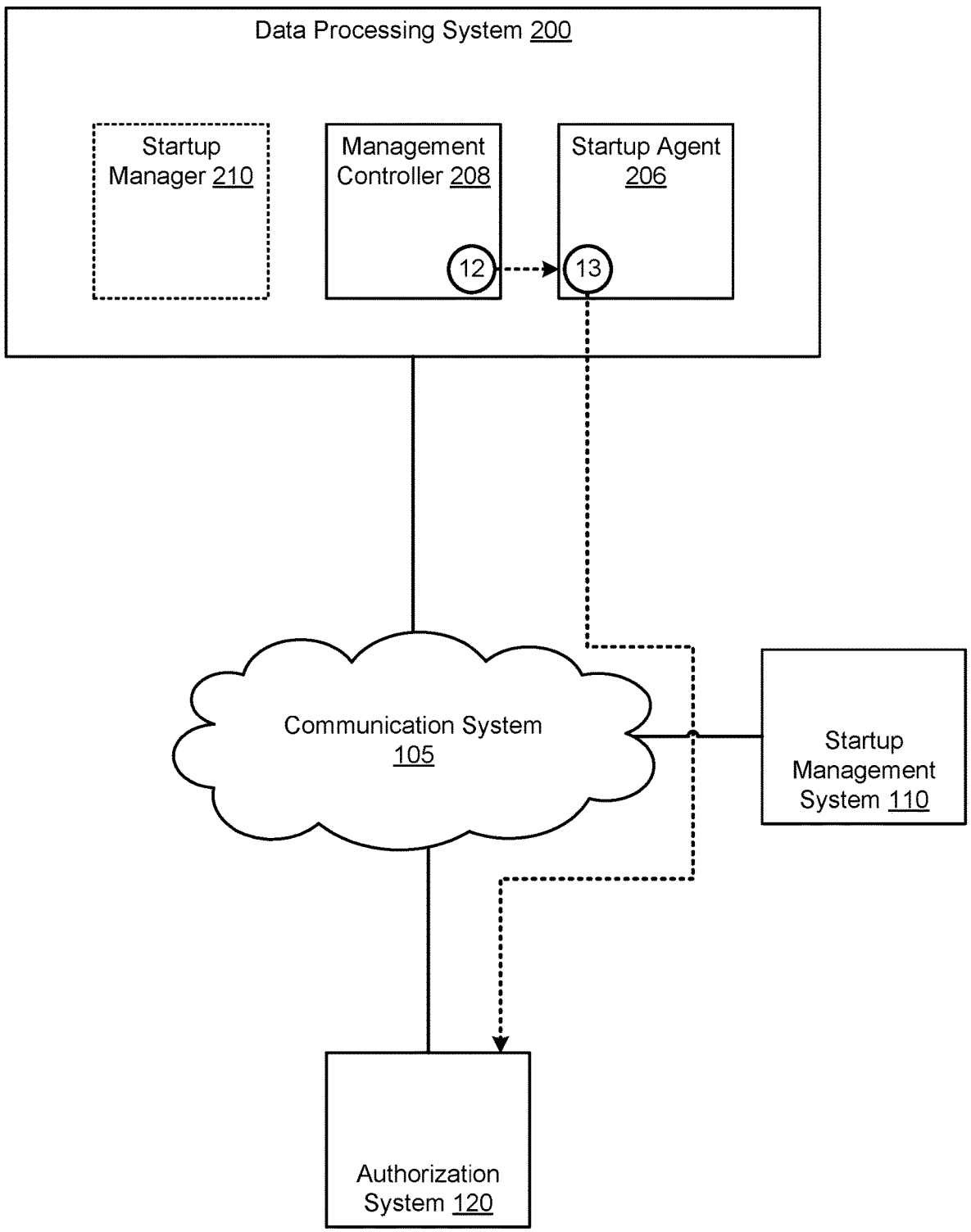
Figure 5C:
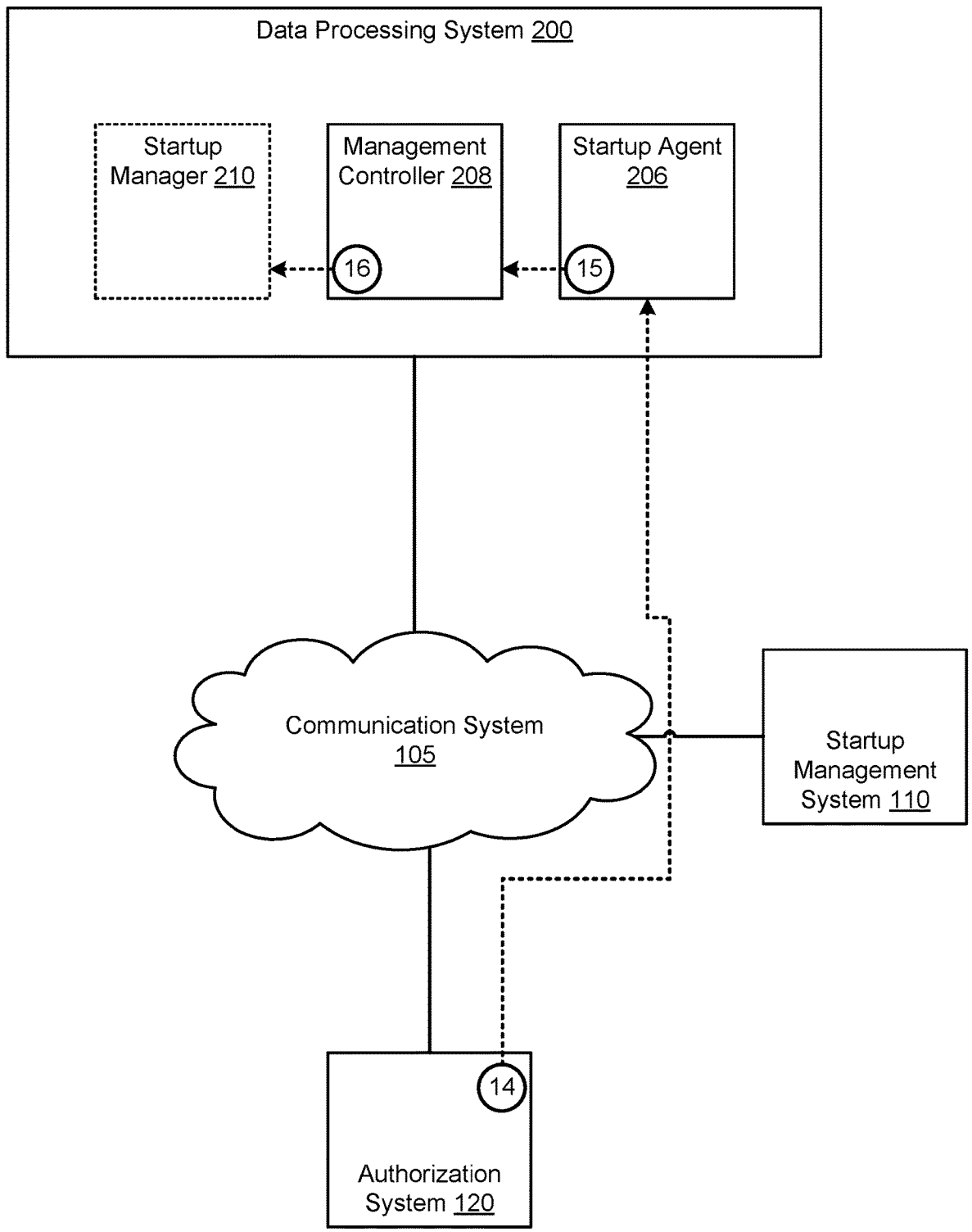

Now, consider a second scenario as illustrated in FIGS. 5A-5C where management controller 208 does not include functionality to directly communicate with authorization system. In such a scenario, when, at blocks 10 and 11, a management communication is received by management controller 208 via startup agent 206, management controller 208 may rely on startup agent 206 to relay communications on its behalf.

Turning to FIG. 5B, at block 12, like block 3, management controller 208 obtains an unauthenticated operation, but instead of sending it directly to authorization system 120 (e.g., via an out-of-band channel), management controller 208 may relay it to authorization system 120 through startup agent 206. Consequently, at block 13, startup agent 206 sends the unauthenticated operation to authorization system 120 for authorization.

Turning to FIG. 5C, at block 14, authorization system 120 authenticates the unauthenticated operation (e.g., by signing it) and sends it to startup agent 206. In turn, at block 15, startup agent relays the authenticated operation to management controller 208. Based on the operation being authenticated, at block 16, management controller 208 instructs startup manager 210 to implement the operation, as discussed with respect to block 5.

Thus, as illustrated in FIGS. 4A-5C, embodiments disclosed herein may facilitate startups of data processing systems that may be restricted without using the credentials with which the startups are restricted. Accordingly, persons tasked with managing data processing systems may be empowered to work with the data processing systems without needing to have access to or be provided with passwords or other credentials that are used to restrict various types of startups. In this manner, the security of data processing systems may be improved by reducing the numbers of persons that may have access to passwords used to manage startups of data processing systems.

Figure 6:
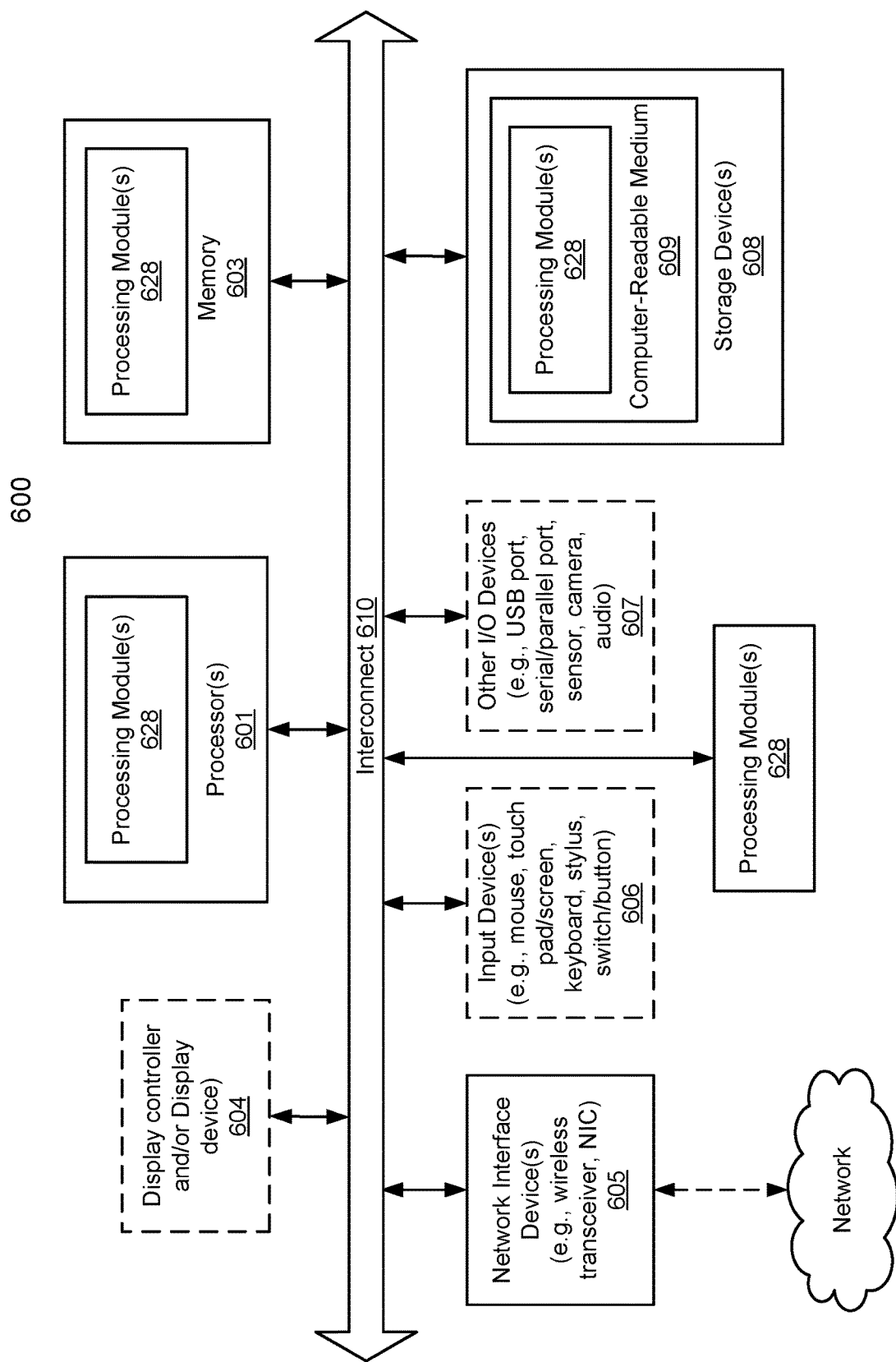
FIG. 6 shows a block diagram illustrating a computing device in accordance with an embodiment.

Any of the components illustrated in FIGS. 1-5C may be implemented with one or more computing devices. Turning to FIG. 6, a block diagram illustrating an example of a computing device in accordance with an embodiment is shown. For example, system 600 may represent any of the data processing systems and/or computing devices described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for managing operation of a data processing system, the method comprising:
   obtaining, by a startup agent of the data processing system, a management communication indicating that the data processing system is to enter a password protected operating state without requiring use of the password to enter the password protected operating state, the startup agent executing while a startup manager of the data processing system that manages startups of the data processing system is not executing, the startups of the data processing system causing the data processing system to enter corresponding operating states;
   providing, by the startup agent, the management communication to a management controller, the management controller being hosted by the data processing system and operating independently from the data processing system;
   making a determination, by the management controller, that the management communication is from a trusted non-human entity that is authorized to modify the startups of the data processing system without use of the password; and
   based on the determination, modifying, by the management controller, a future startup of the data processing system to enter the password protected operating state without use of the password.

2. The computer-implemented method of claim 1, wherein making the determination comprises:
   generating, by the management controller, an unauthenticated operation based on the management communication, the unauthenticated operation comprising a proposed action and authentication data from the trusted non-human entity that initiated the management communication;
   providing, by the management controller; the unauthenticated operation to an authorization system via a first secure communication; and
   responsive to the unauthenticated operation, receiving, by the management controller, an authenticated operation from the authorization system via a second secure communication, the authenticated operation indicating that the proposed action should be performed, the proposed action being a startup of the data processing system to the password protected operating state without use of the password.

3. The computer-implemented method of claim 2, wherein the first secure communication and second secure communication are made, at least in part, via the startup agent, the data processing system is a first independently operating computing device, the management controller is a second independently operating computing device, and the management controller is operably connected to hardware components of the first independently operating computing device.

4. The computer-implemented method of claim 2, wherein the authenticated operation comprises the unauthenticated operation and a signature of the authorization system, the signature being usable by the management controller to verify that the second secure communication is from the authorization system, and the unauthenticated operation of the authenticated operation usable to verify that the authenticated operation is responsive to the first secure communication.

5. The computer-implemented method of claim 1, wherein modifying the future startup of the data processing system to enter the password protected operating state without use of the password comprises:
   modifying a startup order that defines an ordering of different type of startups of the data processing system that may be performed by the startup manager, the modified startup order causing the startup manager to perform startup operations to cause the data processing system to enter the password protected operating state,
   wherein the startup manager is adapted to allow the management controller to modify the startup order without use of the password and require users of the data processing system to use the password to modify the startup order.

6. The computer-implemented method of claim 5, wherein the startup manager requires users of the data processing system to use the password to modify the startup order by requiring that the password be provided by the users prior to being allowed to modify the startup order, and the startup managers allows the management controller to modify the startup order without use of the password by bypassing a requirement for entry of the password for modifying the startup order.

7. The computer-implemented method of claim 5, wherein the startup operations comprise loading of a serviceability operation manager for the data processing system, the startup agent relying on a general operation manager hosted by the data processing system for its operation, and the serviceability operation manager being adapted to modify the startup agent.

8. The computer-implemented method of claim 1, wherein
the management communication is from the trusted non-human entity that is trusted by an authorization system, the authorization system being trusted by the management controller to identify authorized management communications, and
the trusted non-human entity does not first receive and verify the password from a human entity before sending the management communication.

9. The computer-implemented method of claim 1, further comprising:
obtaining, by the startup agent, a second management communication indicating that the data processing system is to enter the password protected operating state;
providing, by the startup agent, the second management communication to the management controller;
making a second determination, by the management controller, that the second management communication cannot be verified as being from the trusted non-human entity that is authorized to modify the startups of the data processing system without use of the password; and
based on the second determination, discarding, by the management controller, the second management communication without attempting to implement the second management communication.

10. The computer-implemented method of claim 9, where making the second determination comprises:
generating, by the management controller, a second unauthenticated operation based on the second management communication, the second unauthenticated operation comprising a proposed action and second authentication data from the trusted non-human entity that initiated the second management communication;
providing, by the management controller; the second unauthenticated operation to an authorization system via a third secure communication; and
responsive to the unauthenticated operation, receiving, by the management controller, a response from the authorization system indicating that the second unauthenticated operation cannot be verified.

11. The computer-implemented method of claim 9, wherein making the second determination comprises:
generating, by the management controller, a second unauthenticated operation based on the second management communication, the second unauthenticated operation comprising a proposed action and second authentication data from the trusted non-human entity that initiated the second management communication;
providing, by the management controller; the second unauthenticated operation to an authorization system via a third secure communication; and
receiving, by the management controller, a second authenticated operation from the authorization system via a fourth secure communication, the second authenticated operation indicating that the proposed action should be performed, the proposed action being the startup of the data processing system to the password protected operating state without use of the password, and the second authenticated operation not being responsive to the second unauthenticated operation,
wherein lack of responsiveness of the second authenticated operation to the second unauthenticated operation indicating that the second management communication cannot be verified.

12. The computer-implemented method of claim 1, wherein when the management communication is received, the data processing system is in a second operating state that is different from the password protected operating state, the data processing system being adapted to automatically enter the second operating state unless a startup order is modified, and the startup order requiring use of the password for modification.

13. A non-transitory machine-readable medium having instructions stored therein, which when executed by a processor, cause a data processing system to perform operations, the operations comprising:
obtaining, by a startup agent of the data processing system, a management communication indicating that the data processing system is to enter a password protected operating state without requiring use of the password to enter the password protected operating state, the startup agent executing while a startup manager of the data processing system that manages startups of the data processing system is not executing, the startups of the data processing system causing the data processing system to enter corresponding operating states;
providing, by the startup agent, the management communication to a management controller, the management controller being hosted by the data processing system and operating independently from the data processing system;
making a determination, by the management controller, that the management communication is from a trusted non-human entity that is authorized to modify the startups of the data processing system without use of the password; and
based on the determination, modifying, by the management controller, a future startup of the data processing system to enter the password protected operating state without use of the password.

14. The non-transitory machine-readable medium of claim 13, wherein making the determination comprises:
generating, by the management controller, an unauthenticated operation based on the management communication, the unauthenticated operation comprising a proposed action and authentication data from the trusted non-human entity that initiated the management communication;
providing, by the management controller; the unauthenticated operation to an authorization system via a first secure communication; and
responsive to the unauthenticated operation, receiving, by the management controller, an authenticated operation from the authorization system via a second secure communication, the authenticated operation indicating that the proposed action should be performed, the proposed action being a startup of the data processing system to the password protected operating state without use of the password.

15. The non-transitory machine-readable medium of claim 14, wherein the first secure communication and second secure communication are made, at least in part, via the startup agent.

16. The non-transitory machine-readable medium of claim 14, wherein the authenticated operation comprises the unauthenticated operation and a signature of the authorization system, the signature being usable by the management controller to verify that the second secure communication is from the authorization system, and the unauthenticated operation of the authenticated operation usable to verify that the authenticated operation is responsive to the first secure communication.

17. A data processing system, comprising:
a hardware processor adapted to execute an application configured to:
obtain a management communication indicating that the data processing system is to enter a password protected operating state without requiring use of the password to enter the password protected operating state, the application executing while a startup manager of the data processing system that manages startups of the data processing system is not executing, the startups of the data processing system causing the data processing system to enter corresponding operating states; and
provide the management communication to a management controller, the management controller being hosted by the data processing system and operating independently from the data processing system;
a management controller configured to:
make a determination that the management communication is from a trusted non-human entity that is authorized to modify the startups of the data processing system without use of the password; and
based on the determination, modify a future startup of the data processing system to enter the password protected operating state without use of the password.

18. The data processing system of claim 17, wherein making the determination comprises:

generating an unauthenticated operation based on the management communication, the unauthenticated operation comprising a proposed action and authentication data from the trusted non-human entity that initiated the management communication;

providing the unauthenticated operation to an authorization system via a first secure communication; and responsive to the unauthenticated operation, receiving an authenticated operation from the authorization system via a second secure communication, the authenticated operation indicating that the proposed action should be performed, the proposed action being a startup of the data processing system to the password protected operating state without use of the password.

19. The data processing system of claim 18, wherein the first secure communication and second secure communication are made, at least in part, via the application.

20. The data processing system of claim 18, wherein the authenticated operation comprises the unauthenticated operation and a signature of the authorization system, the signature being usable by the management controller to verify that the second secure communication is from the authorization system, and the unauthenticated operation of the authenticated operation usable to verify that the authenticated operation is responsive to the first secure communication.

\* \* \* \* \*